United States Patent [19]
Everhard et al.

[11] Patent Number: 5,186,282
[45] Date of Patent: Feb. 16, 1993

[54] VERTICAL TRANSPORT APPARATUS

[75] Inventors: Paul R. Everhard, Nicholasville; Alan L. Everhard; Roy K. Monroe, both of Lexington, all of Ky.

[73] Assignee: Aging Technologies, Inc., Lexington, Ky.

[21] Appl. No.: 850,658

[22] Filed: Mar. 12, 1992

Related U.S. Application Data

[63] Continuation-in-part of Ser. No. 824,337, Jan. 23, 1992, abandoned.

[51] Int. Cl.$^5$ .............................................. B60S 13/00
[52] U.S. Cl. .................................. 187/8.59; 414/921; 254/89 R
[58] Field of Search ................. 187/9 R, 17, 8.59, 20, 187/18; 414/921, 495; 182/141; 254/6 R, 89 R Primary Examiner—Robert P. Olszewski
Assistant Examiner—Kenneth Noland
Attorney, Agent, or Firm—Frank C. Leach, Jr.

[57] ABSTRACT

A support platform for a person in a wheelchair is disposed at ground level and mounted on the top of a movable support frame within a hole in the ground. The movable support frame is surrounded by a fixed frame having guide rollers for guiding the movable support frame in its vertical movement. A U-shaped handrail, which is not above the ground when the handrail is in its lowermost position, moves upwardly initially relative to the support platform. When the handrail has been moved upwardly a first predetermined distance by a drive arrangement, the drive arrangement then causes the movable support frame to move upwardly with the handrail to transport the person in the wheelchair on the support platform from the ground level position to a raised position at which the support platform is level with a surface of a building to enable the wheelchair to be rolled to the surface of the building. When the person is to be transported from the raised position of the support platform to the ground level position, the handrail and the movable support frame move downwardly together until downward motion of the movable support frame is stopped by the fixed frame; then the handrail continues to be moved downwardly until it is stopped at its lowermost position by stopping the drive arrangement.

23 Claims, 15 Drawing Sheets

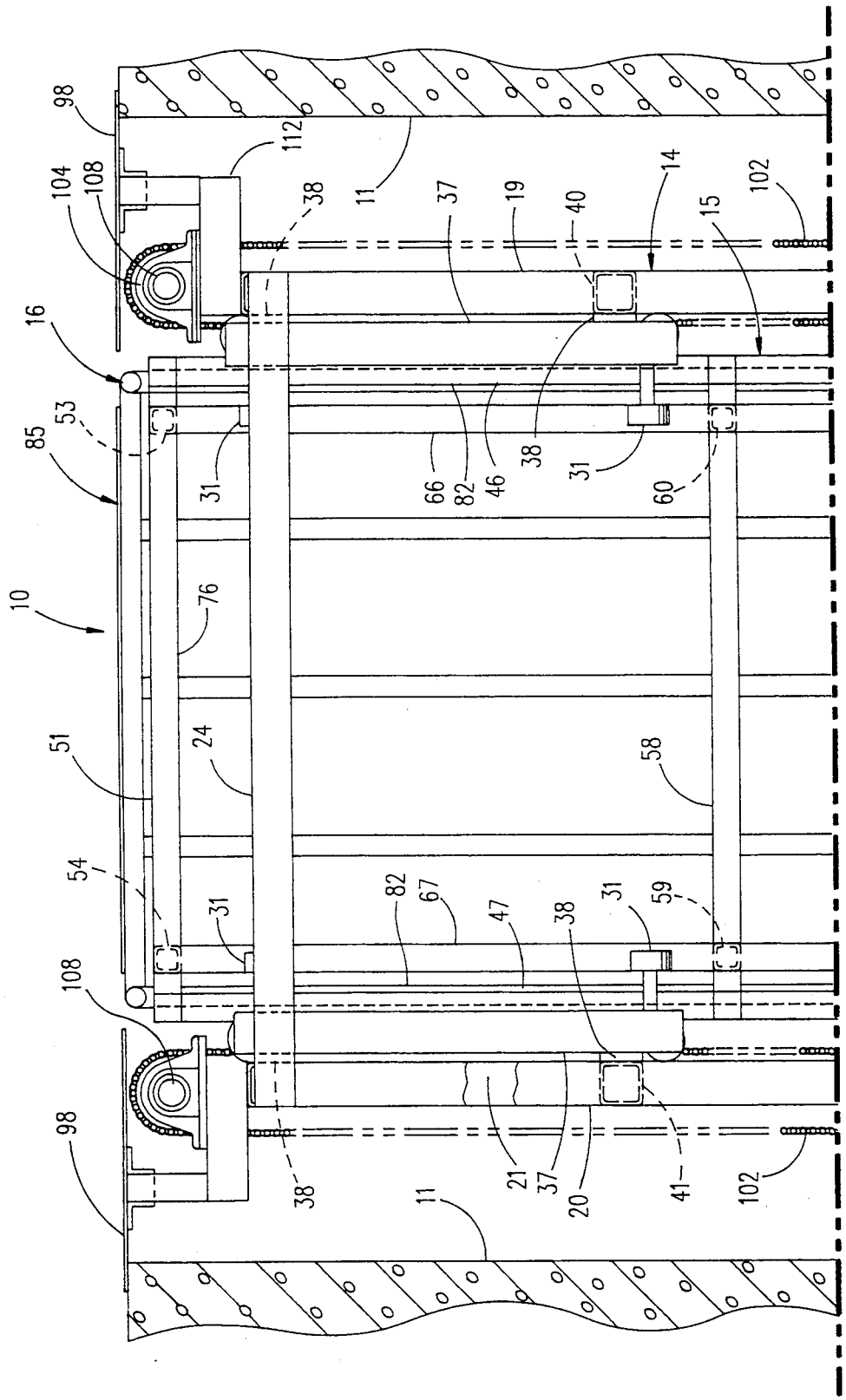

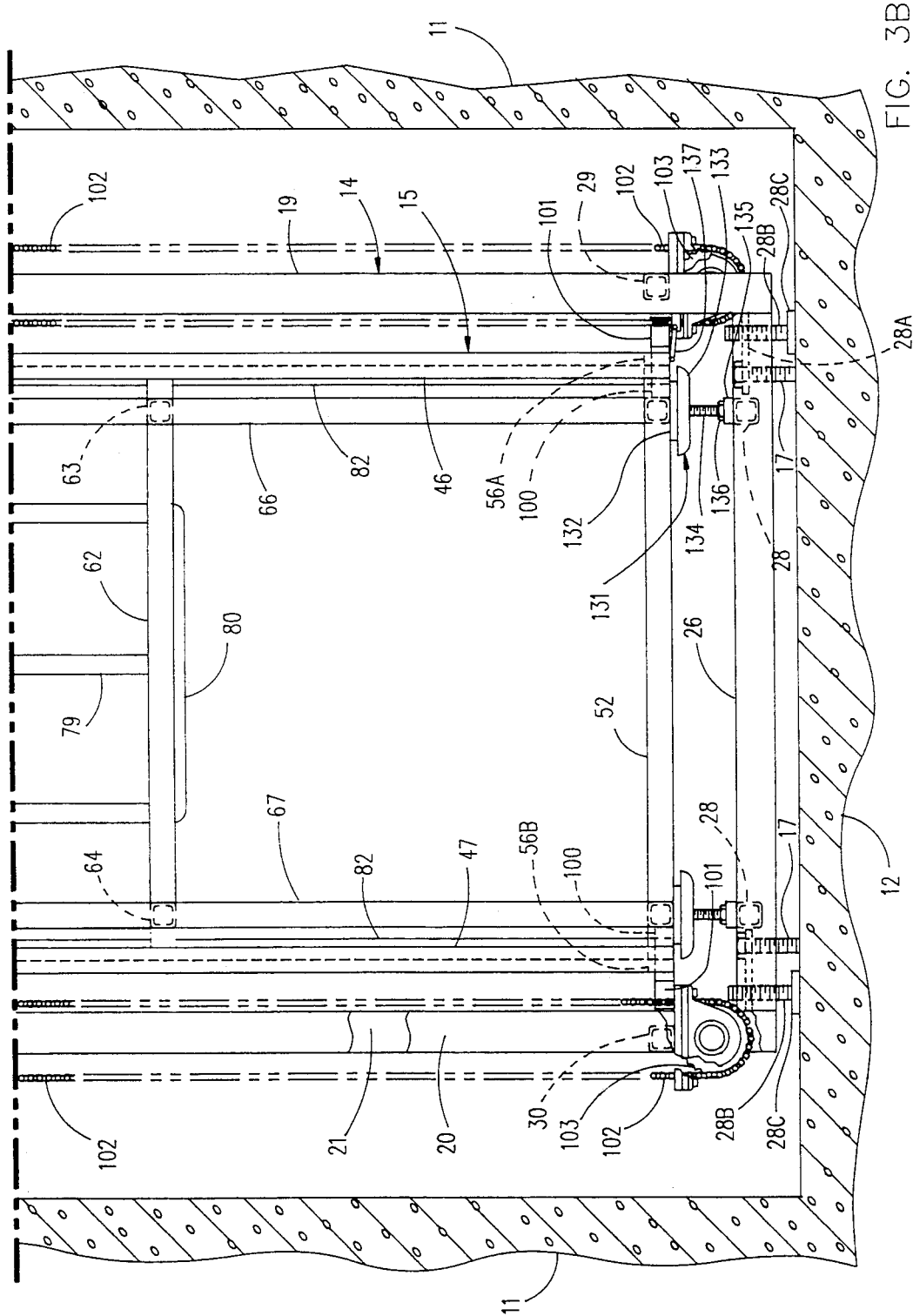

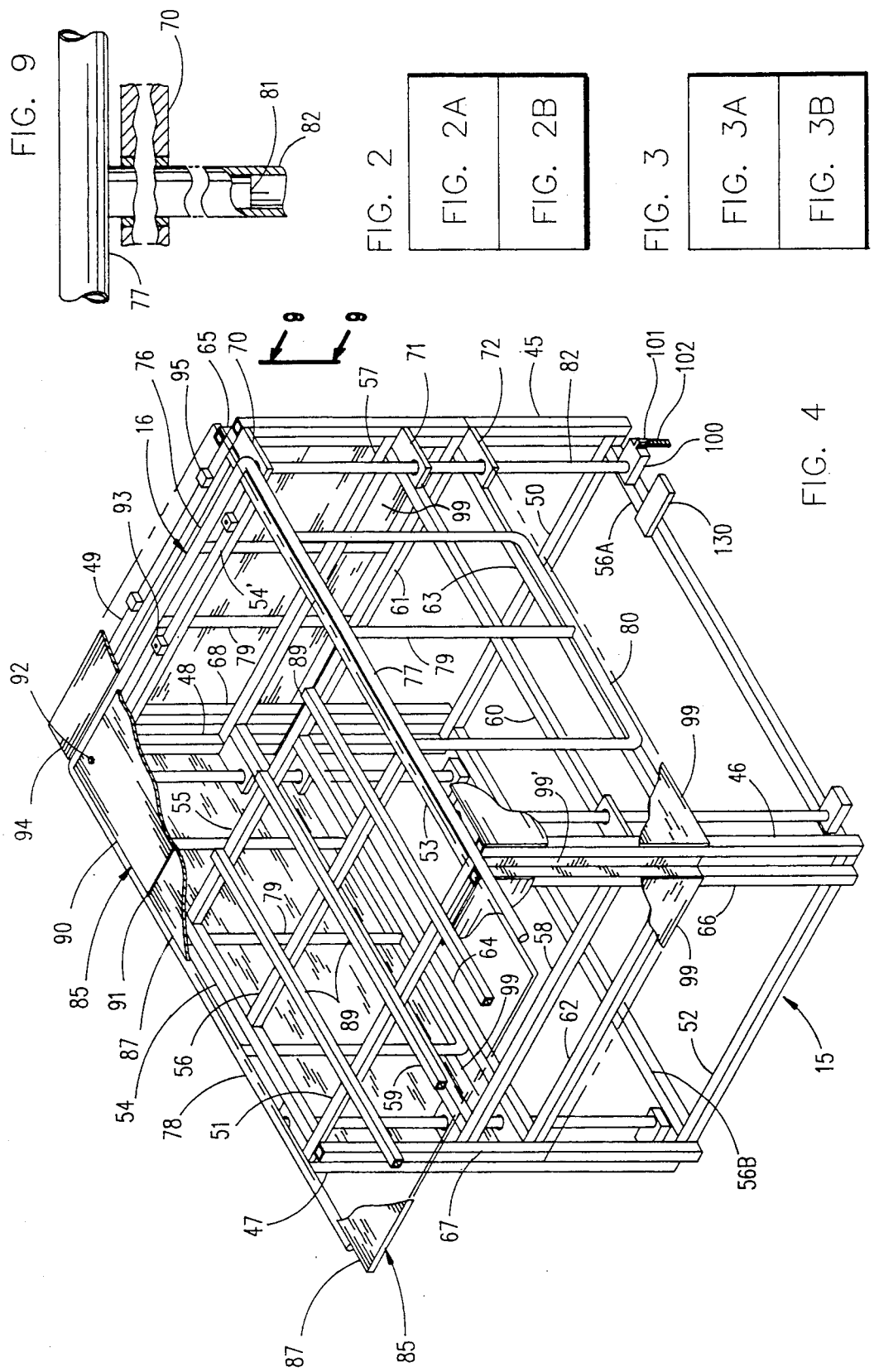

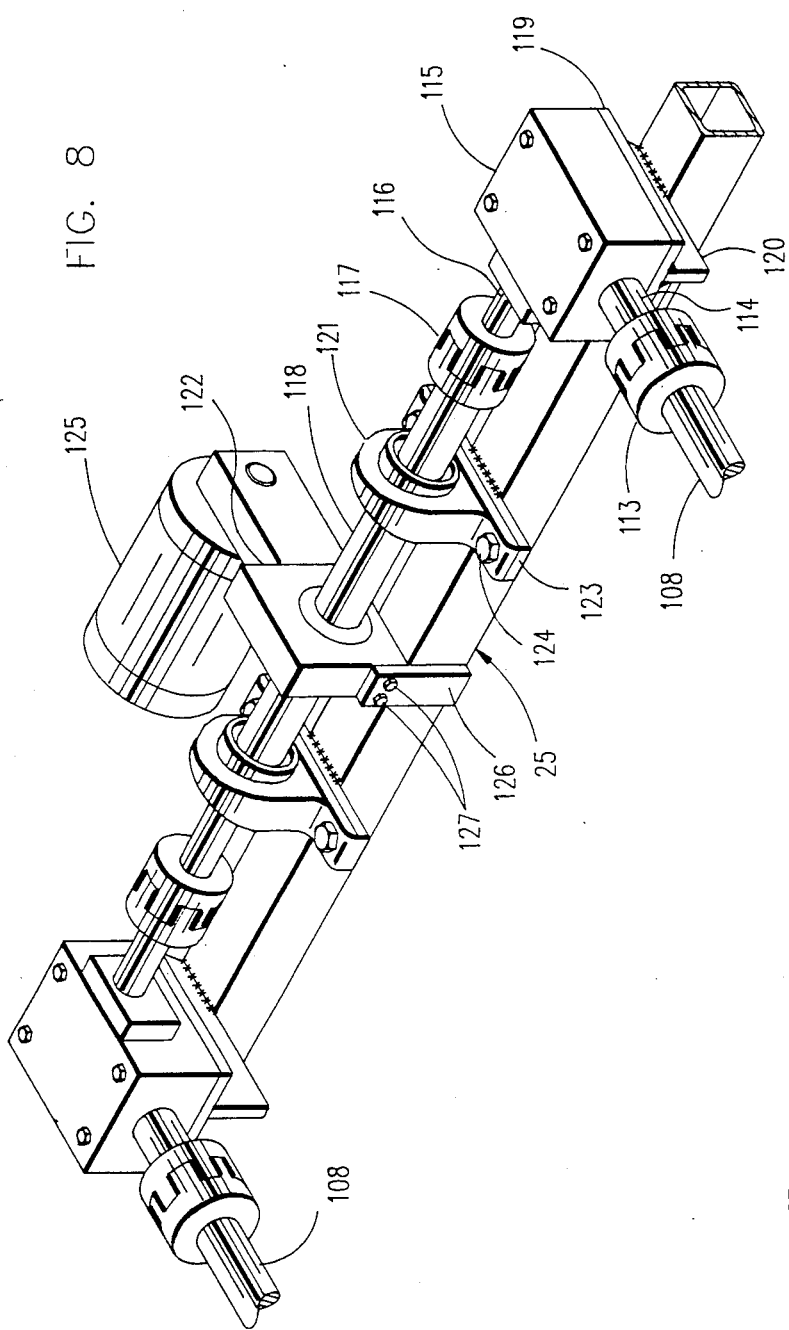
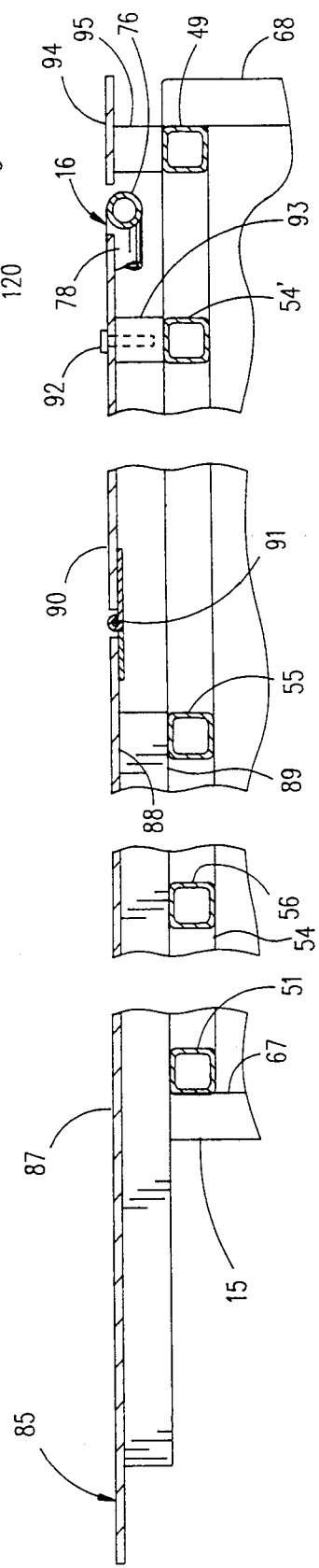
FIG. 8
FIG. 7

VERTICAL TRANSPORT APPARATUS

This is a continuation-in-part of application Ser. No. 07/824,337, filed Jan. 23, 1992, now abandoned.

This invention relates to a vertical transport apparatus and, more particularly, to a vertical transport apparatus for transporting a person from a ground level position to a raised position and vice versa.

Access to a building for a disabled person, particularly one in a wheelchair, can occur through either the person and the wheelchair being carried manually by others over steps or by rolling the wheelchair up or down a ramp, for example. However, the new Americans With Disabilities Act requires access for handicapped persons to various public buildings to be available. The Act is not satisfied by the wheelchair being manually carried, for example.

While a ramp is normally satisfactory to provide access for a person in a wheelchair, there are structures in which this cannot be accomplished. For example, a historic building in which it is desired or necessary to preserve the original building does not readily lend itself to a ramp.

The vertical transport apparatus of the present invention satisfactorily solves the foregoing problem through providing an arrangement in which the vertical transport apparatus is substantially hidden from view when not used. At the same time, the vertical transport apparatus of the present invention provides a safe arrangement for vertically transporting a person in a wheelchair from a ground level position to a raised position and vice versa.

An object of this invention is to provide an apparatus for transporting a person between a ground level position and a raised position.

Other objects of this invention will be readily perceived from the following description, claims, and drawings.

This invention relates to a vertical transport apparatus for transporting a person from a ground level position to a raised position and vice versa including movable support means for supporting a person including a support surface disposed above the ground when the movable support means is in its lowermost position. At least a portion of the support surface of the movable support means is surrounded by retaining means for retaining the person on the support surface of the movable support means with the retaining means having no portion disposed above the ground when the retaining means is in its lowermost position. First causing means causes lifting of the retaining means relative to the movable support means for a first predetermined distance relative to the movable support means to dispose the retaining means in a raised position relative to the support surface of the movable support means. Second causing means causes lifting of the movable support means with the retaining means for a second predetermined distance to their uppermost positions after the retaining means has been lifted the first predetermined distance relative to the movable support means. The support surface of the movable support means is substantially level with a surface of another structure when the retaining means and the movable support means are in their uppermost positions.

The attached drawings illustrate preferred embodiments of the invention, in which:

FIG. 2 is a block diagram showing the relation of FIGS. 2A and 2B;

FIG. 3 is a block diagram showing the relation of FIGS. 3A and 3B;

FIGS. 3A and 3B are front elevational views of the vertical transport apparatus of FIG. 1 with the enclosure plates of the vertically movable support frame omitted for clarity purposes and taken along line 3—3 of FIG. 1;

FIG. 4 is a perspective view of a handrail, a movable support frame, and a portion of a driving arrangement of the vertical apparatus of the present invention;

FIG. 7 is a sectional view, partly in elevation, showing a frame of the vertical transport apparatus of the present invention and taken along line 7—7 of FIG. 1;

FIG. 8 is a perspective view of a portion of the driving arrangement of the vertical transport apparatus of the present invention;

FIG. 9 is a fragmentary side elevational view, partly in section, of a portion of the handrail and the movable support frame and taken along line 9—9 of FIG. 4;

Figure 11:
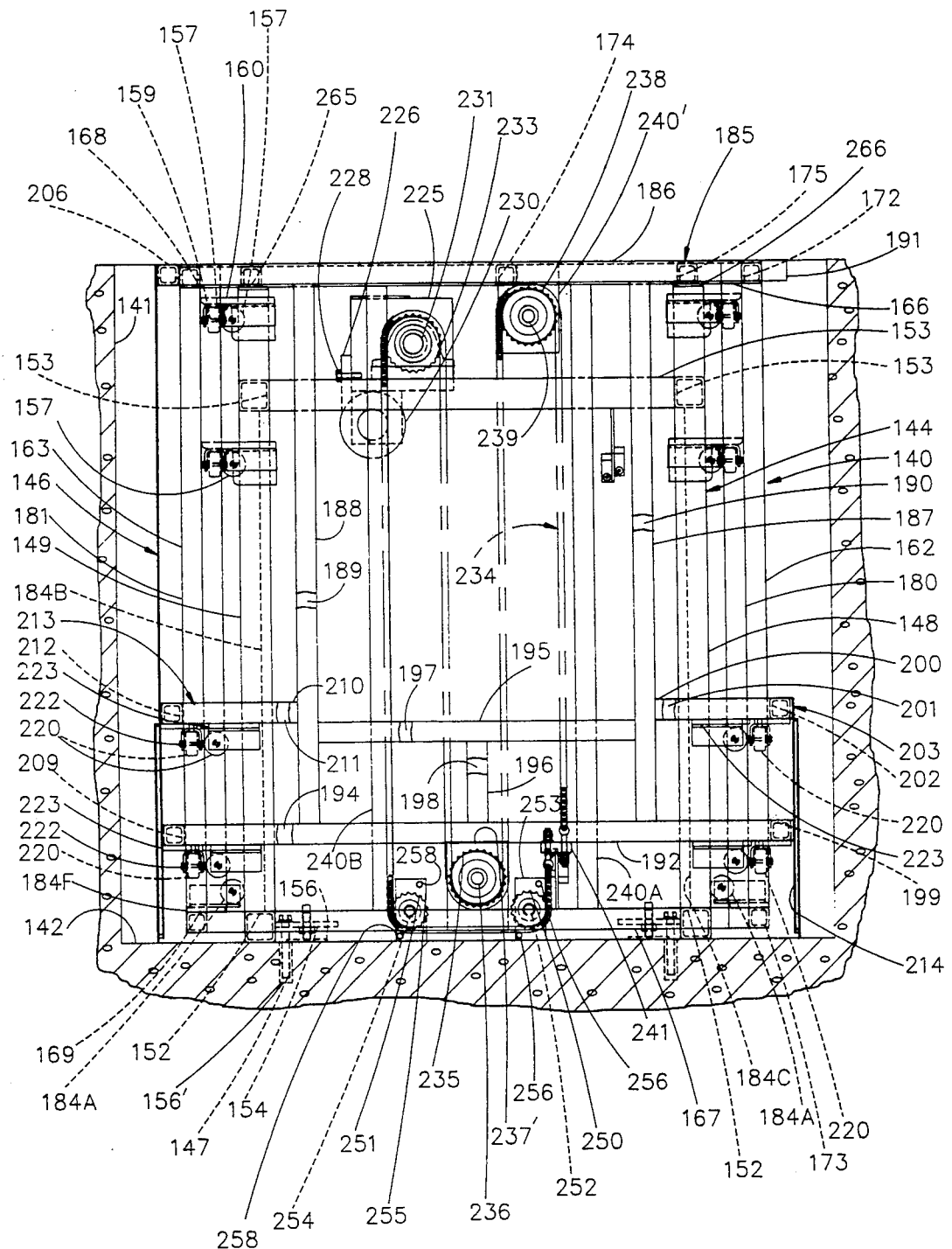
FIG. 11 is a side elevational view of the vertical transport apparatus of FIG. 10 with portions of a retainer enclosure and a vertically movable support frame skirt omitted for clarity purposes and taken along line 11—11 of FIG. 10.
Figure 12:
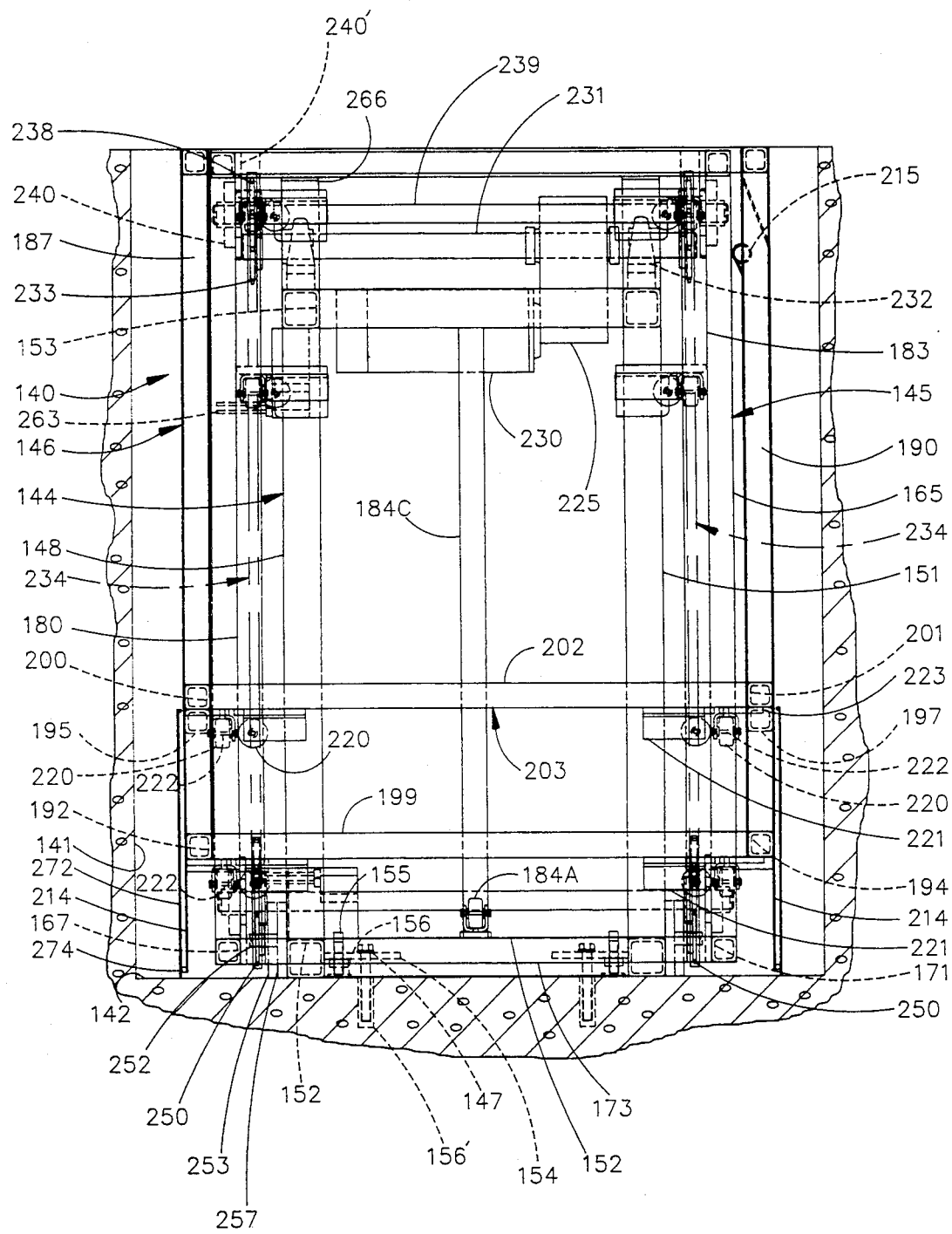
FIG. 12 is a front elevational view of the vertical transport apparatus of FIG. 10 with portions of the retainer enclosure and the vertically movable support frame skirt omitted for clarity purposes and taken along line 12—12 of FIG. 10.
Figure 17:
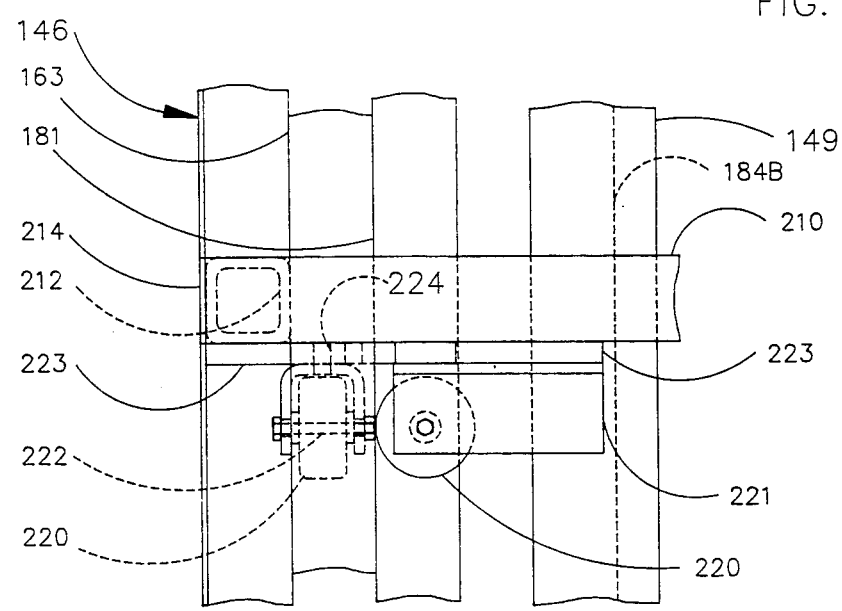
Figure 18:
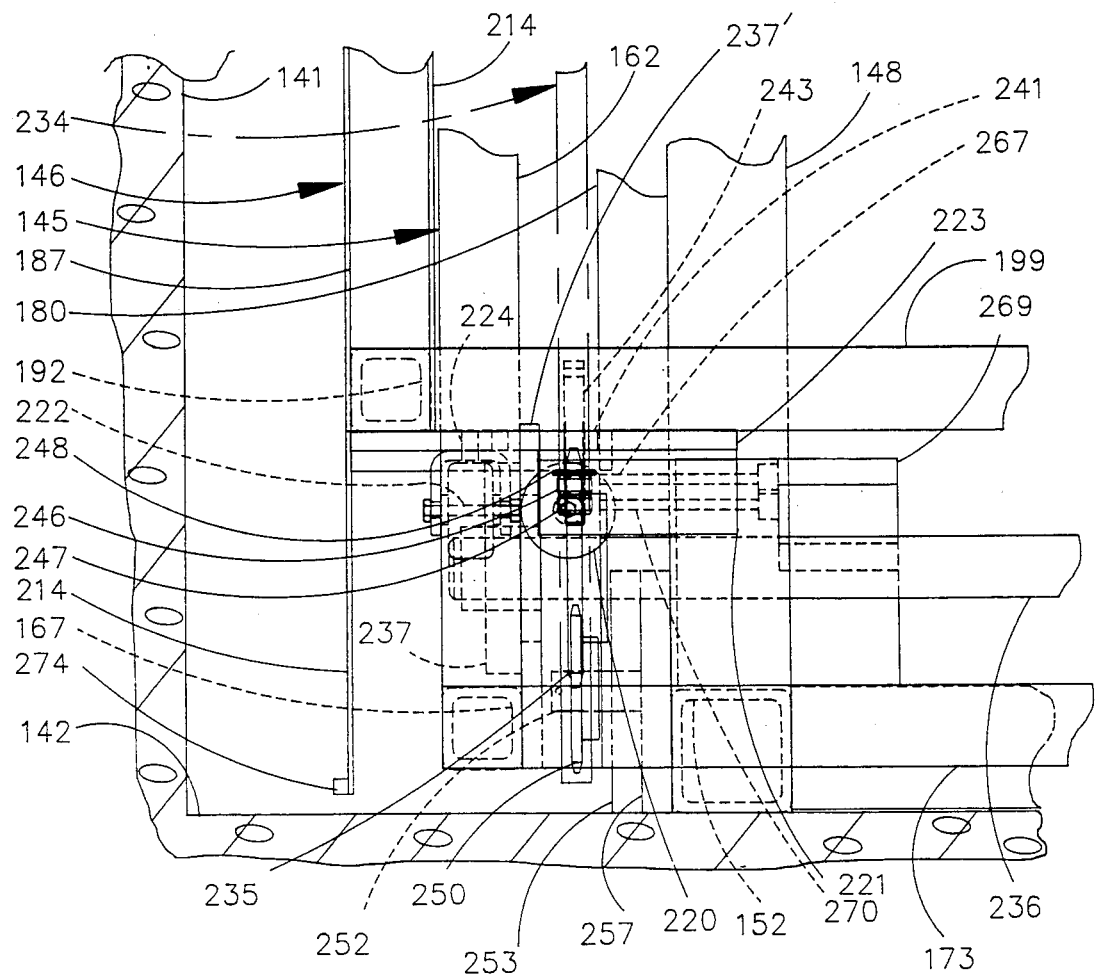
Figure 19:
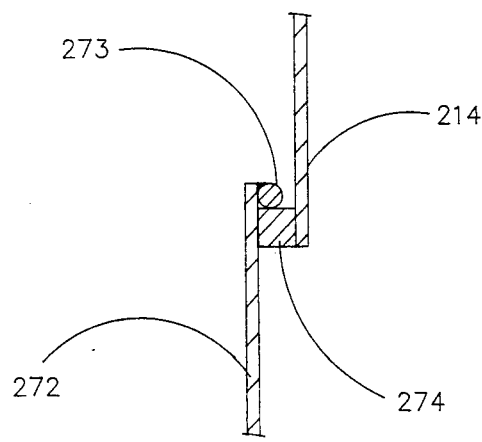

FIG. 17 is an enlarged fragmentary side elevational view of a portion of the vertical transport apparatus of FIG. 11 and showing the mounting arrangement for one pair of guide rollers on the retainer for guiding the retainer along the vertical movable support frame during vertical movement of the retainer; and FIG. 18 is an enlarged fragmentary front elevational view of a portion of the vertical transport apparatus of FIG. 12 and showing the mounting arrangements for one pair of the guide rollers on the retainer and for two chain sprockets; and FIG. 19 is an enlarged sectional view of a portion of a retainer enclosure plate and a plate with which it cooperates.

Figure 1:
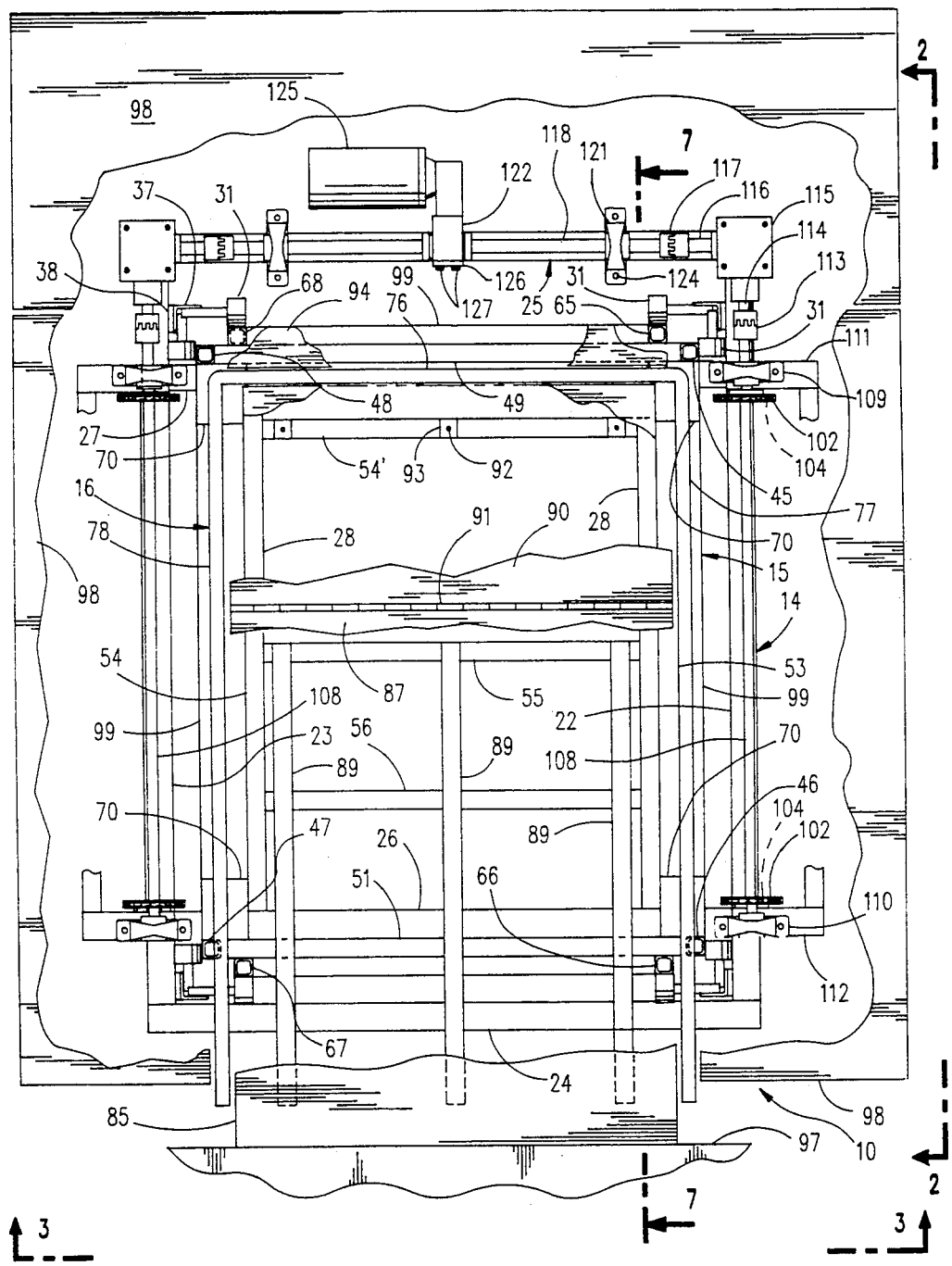
FIG. 1 is a top plan view of one embodiment of a vertical transport apparatus of the present invention.

Referring to the drawings and particularly FIG. 1, there is shown a vertical transport apparatus 10. The vertical transport apparatus 10 is disposed within a hole in the ground having concrete vertical walls 11 (see FIG. 2B) and a concrete bottom wall 12 forming a concrete pit.

The vertical transport apparatus 10 includes a fixed support frame 14, a vertically movable support frame 15, and a vertically movable handrail 16 (see FIG. 2A) having a U-shape when viewed from above. The fixed support frame 14 (see FIG. 2B) is secured to the concrete bottom wall 12 by four bolts 17.

When viewed from above as shown in FIG. 1, the fixed support frame 14 has a substantially rectangular shape. The fixed support frame 14 includes four vertically extending square tubes 18 (see FIG. 2B), 19, 20 (see FIG. 3A), and 21 (see FIG. 5) forming a rectangular shape when viewed from above. A first horizontal square tube 22 (see FIG. 2A) connects the upper ends of the vertical square tubes 18 and 19. A second horizontal square tube 23 (see FIG. 1), which is parallel to the tube 22, connects the upper ends of the horizontal square tubes 20 (see FIG. 3A) and 21.

A first U-shaped (when viewed from above) horizontal square tube 24 (see FIG. 2A) connects the vertical tubes 19 (see FIG. 3A) and 20 to each other adjacent their upper ends. A second U-shaped (when viewed from above) horizontal square tube 25 (see FIG. 1) connects the vertical tubes 18 (see FIG. 2A) and 21 to each other adjacent their upper ends.

The bottom ends of the vertical tubes 19 (see FIG. 3B) and 20 are joined to each other by a first horizontal square tube 26, which is substantially parallel to a second horizontal square tube 27 (see FIG. 1) connecting the bottom ends of the vertical tubes 18 (see FIG. 2A) and 21 to each other. Two parallel horizontal square tubes 28 (see FIG. 1) connect the horizontal square tube 26 and 27 to each other.

Each of the four bolts 17 (see FIG. 2B) is supported by a triangular shaped plate 28A. One of the plates 28A is disposed at each of the four corners formed by one of the square tubes 28 and one of the square tubes 26 and 27 and welded to each.

The plates 28A also supports a jack screw 28B having its bottom end in a counterbore in a metal pad 28C and bearing against the metal pad 28C, which rests on the concrete bottom wall 12. The jack screws 28B are used to level the fixed support frame 14 prior to attaching the bolts 17 to the concrete bottom wall 12.

Two parallel horizontal square tubes 29 (see FIG. 3B) and 30 are disposed in a plane above the square tubes 28 and parallel thereto. The tube 29 extends between the vertical tubes 18 (see FIG. 2B) and 19, and the tube 30 (see FIG. 3B) extends between the vertical tubes 20 and 21.

Figure 2A:
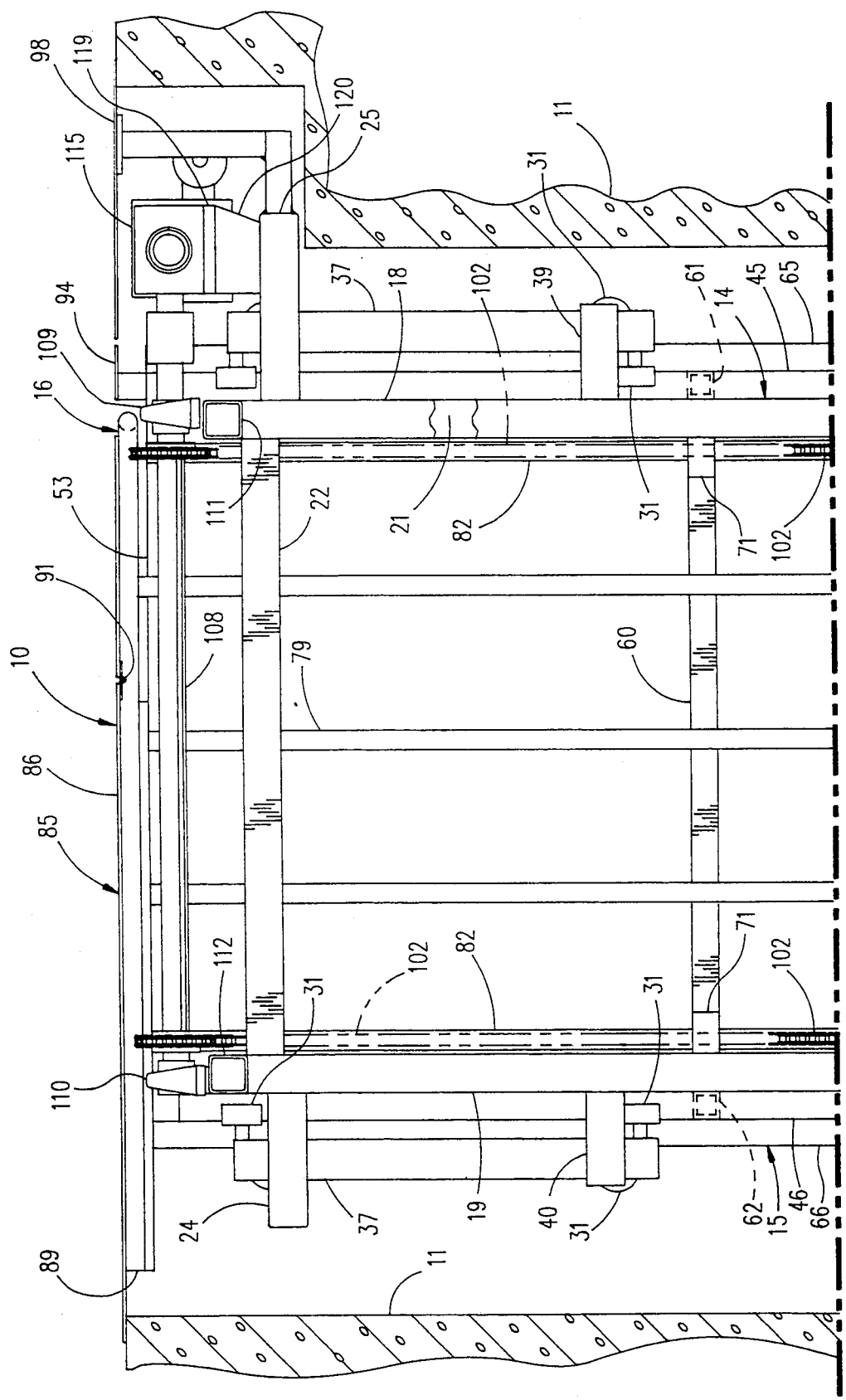
FIGS. 2A and 2B are side elevational views of the vertical transport apparatus of FIG. 1 with enclosure plates of a vertically movable support frame omitted for clarity purposes and taken along line 2—2 of FIG. 1.

The fixed support frame 14 (see FIG. 1) has upper and lower pair of guide rollers 31 at each of its four corners. As shown in FIGS. 2A and 3A, the upper and lower pairs of the guide rollers 31 are vertically spaced from each other in each of the four corners.

Figure 5:
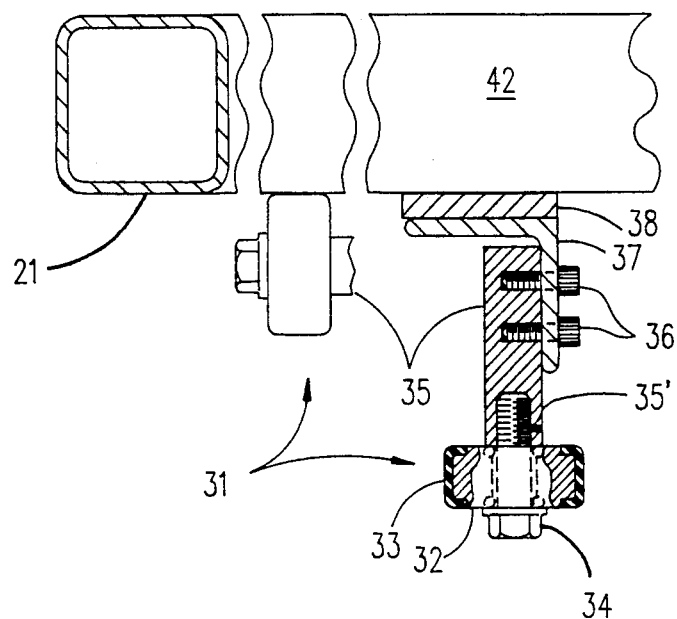
FIG. 5 is a top plan view, partly in section, showing a mounting arrangement for one of the guide rollers of the fixed support frame of the vertical transport apparatus of the present invention.

As shown in FIG. 5, each of the guide rollers 31 includes an aluminum hub 32 and an outer rubber wheel 33. The hub 32 of the guide roller 31 is secured by a shoulder bolt 34 to a bock 35; a set screw 35' insures that the shoulder bolt 34 is retained in the block 35.

The block 35 is secured by screws 36 to a vertically extending angle bracket 37. The angle bracket 37 is fixed by welding, for example, to two vertically spaced plates 38, which are fixed to the fixed support frame 14 (see FIG. 3A).

Each of the upper of the two vertically spaced plates 38, which are fixed to the angle bracket 37 at each of the corners, is fixed to one of the horizontal U-shaped tubes 24 and 25 (see FIG. 1). Each of the lower of the two vertically spaced plates 38 (see FIG. 3A) is fixed to one of four horizontal square tube 39 (see FIG. 2A), 40, 41 (see FIG. 3A), and 42 (see FIG. 5) extending from the vertical tubes 18 (see FIG. 2A), 19 20 (see FIG. 3A), and 21 (see FIG. 5), respectively. Accordingly, each of the angle brackets 37 (see FIG. 2A) has four of the guide rollers 31 mounted thereon so that the upper and lower pairs of the guide rollers 31 in each corner are supported by the same vertically extending angle bracket 37.

As shown in FIG. 4, the vertically movable support frame 15 has four vertical square tubes 45, 46, 47, and 48. The vertical tubes 45 and 48 are connected at their upper ends by a square horizontal tube 49 and at their lower ends by a horizontal square tube 50. Similarly, the upper ends of the vertical tubes 46 and 47 are connected by a horizontal square tube 51 and their lower ends are connected by a horizontal square tube 52.

Two upper horizontal square tubes 53 and 54, which are substantially parallel to each other, extend between the upper horizontal tubes 49 and 51 and are secured thereto, preferably by welding. Three horizontal square tubes 54, 55, and 56, which are substantially parallel to each other, extend between the upper horizontal tubes 53 and 54 and are secured thereto, preferably by welding. Two lower horizontal square tubes 56A and 56B, which are substantially parallel to each other, extend between the bottom tubes 50 and 52 and are secured thereto, preferably by welding.

A horizontal square tube 57, which is substantially parallel to the upper horizontal tube 49 but vertically spaced downwardly therefrom, extends between the vertical tubers 45 and 48 and is secured to each, preferably by welding. A horizontal square tube 58 which is in the same plane as the square tube 57, extends between the vertical tubes 46 and 47 and is secured to each, preferably by welding. The horizontal tube 57 is substantially parallel to the upper horizontal tube 51 but spaced therefrom.

Two substantially parallel horizontal square tubes 59 and 60 extend between the horizontal tubes 57 and 58 and are secured to each, preferably by welding. The two horizontal tubes 59 and 60 are in the same plane as the horizontal tubes 57 and 58.

A horizontal square tube 61, which is vertically spaced beneath the horizontal tube 57 and substantially parallel thereto, extends between the vertical tubes 45 and 48 and is secured to each, preferably by welding. A horizontal square tube 62, which is vertically spaced from the horizontal tube 58 and substantially parallel thereto, extends between the vertical tubes 46 and 47 and is secured to each, preferably by welding. Two horizontal square tubes 63 and 64 extend between the horizontal tubes 61 and 62 and are secured thereto, preferably by welding. The horizontal tubes 63 and 64 are in the same plane as the tubes 61 and 62.

The vertically movable support frame 15 has four additional vertical square tubes 65, 66, 67, and 68, which are adjacent the vertical tubes 45, 46, 47, and 48, respectively. The vertical tubes 65 and 68 are secured to the horizontal tubes 49, 50, 57, and 61, preferably by welding. The vertical tubes 66 and 67 are secured to the horizontal tubes 51, 52, 58, and 62, preferably by welding.

When the vertically movable support frame 15 moves vertically, each of the vertical tubes 45-48 and 65-68 has two of the vertically spaced rollers 31 riding along one of its outer surfaces as shown in FIG. 1. Thus, the upper and lower pairs of the guide rollers 31 in one of the corners of the fixed support frame 14 cooperates with the vertical tubes 45 and 65, for example.

The vertically movable support frame 15 (see FIG. 4) also has four horizontal bearing blocks 70 mounted in the same plane as the upper horizontal tubes 49, 51, 53, and 54. Each of the bearing blocks 70 is secured, preferably by welding, to the adjacent tubes such as the vertical tube 45 and the horizontal tubes 49 and 53, for example.

Four additional bearing blocks 71 are mounted in the same plane as the horizontal tubes 57-60. Each of the bearing blocks 71 is secured, preferably by welding, to the adjacent tubes such as the vertical tube 45 and the horizontal tubes 57 and 60, for example.

A third set of four bearing blocks 72 is mounted in the same plane as the horizontal tubes 61-64. Each of the bearing blocks 72 is secured, preferably by welding, to the adjacent tubes such as the vertical tube 45 and the horizontal tubes 61 and 63, for example.

The U-shaped handrail 16 includes a base 76 and two substantially parallel legs 77 and 78 in the same horizontal plane. Each of the base 76 and the legs 77 and 78 has three downwardly extending rods 79, which are joined together at their bottom ends by a rod 80.

Each of the legs 77 and 78 of the handrail 16 has a pair of posts 81 (see FIG. 9) extending downwardly therefrom near its ends and substantially parallel to the rods 79 (see FIG. 4). Each of the posts 81 (see FIG. 9) extends into the upper end of a vertical hollow tube 82. Each of the hollow tubes 82 slidably extends through an opening in one of each of the four bearing blocks 70 (see FIG. 4), 71, and 72 and has its upper end engaging the bottom surface of the leg 77 (see FIG. 9) or 78 (see FIG. 4) of the handrail 16.

The vertically movable support frame 15 has a support platform 85 supported in spaced relation above the top of the movable support frame 15. The support platform 85 has a substantially flat upper surface 86 (see FIG. 2A) supporting a wheelchair and a person in it.

The support platform 85 includes a first portion 87 (see FIG. 7), which has its bottom surface 88 welded to three substantially parallel horizontal square tubes 89. The tubes 89, which are welded to the horizontal tubes 51, 55, and 56 of the vertically movable support frame 15, space the first portion 87 of the support platform 85 from the top of the vertically movable support frame 15.

The support platform 85 has a second portion 90, which is a continuation of the first portion 87, pivotally connected to the first portion 87 by a hinge 91. The second portion 90 of the support platform 85 is retained in the same horizontal plane as the first portion 87 of the support platform 85 by bolts 92 extending through the second portion 90 into tapped holes in block 93, which are welded to the horizontal tube 54'.

By having the second portion 90 of the support platform 85 pivotally connected to the first portion 87, access to the vertically movable support frame 15 and the fixed support frame 14 (see FIG. 2A) is obtained by removing the bolts 92 (see FIG. 7) from the blocks 93. The horizontal tubes 54' and 55 are spaced sufficiently apart to enable a person to enter therebetween.

The support platform 85 has a third portion 94, which is in the same horizontal plane as the first portion 87 and the second portion 90. The third portion 94 is welded to three blocks 95, for example. Each of the three blocks 95 is fixed to the horizontal tube 49 (see FIG. 4) by welding, for example. The third portion 94 (see FIG. 7) of the support platform 85 extends for a relatively short distance and is spaced from the second portion 90 of the support platform 85 so that the base 76 of the handrail 16 can pass therebetween to reach its lowermost position in its downward movement as well as move upwardly to its raised position.

The first portion 87 (see FIG. 1) of the support platform 85 extends to a building 97 having a surface with which the substantially flat upper surface 86 (see FIG. 2A) of the support platform 85 is to be level when the support platform 85 is in its uppermost position.

A plurality of metal plates 98 (see FIG. 1) is supported by the fixed support frame 14 (see FIG. 2A). The plates 98 (see FIG. 1) are in the same horizontal plane as the support platform 85 when the support platform 85 is in its lowermost position.

The vertically movable support frame 15 (see FIG. 4) has four plates 99 welded thereto and extending between the vertical tubes 45 and 46, 66 and 67, 47 and 48, and 65 and 68. The vertically movable support frame 15 has four L-shaped plates 99' welded thereto and extending between the vertical tubes 45 and 65, 46 and 66, 47 and 67, and 48 and 68. The plates 99 and and 99' enclose approximately the upper two thirds of the vertically movable support frame 15.

The bottom end of each of the tubes 82 (see FIG. 2B) extends into a hole in a block 100 to which the tube 82 is welded. The block 100 has a reduced extension 101 having links of a continuous chain 102 attached thereto. Thus, there are four of the chains 102 since there are four of the tubes 82.

Each of the chains 102 passes around a lower sprocket 103 (see FIG. 3B) and an upper sprocket 104 (see FIG. 3A). The two lower sprockets 103 (see FIG. 2B) adjacent the vertical tubes 18 and 19 for two of the four chains 102 are fixed to a lower shaft 105, which is supported in two pillow block bearings 106. The pillow block bearings 106 are supported on the tube 29.

Figure 6:
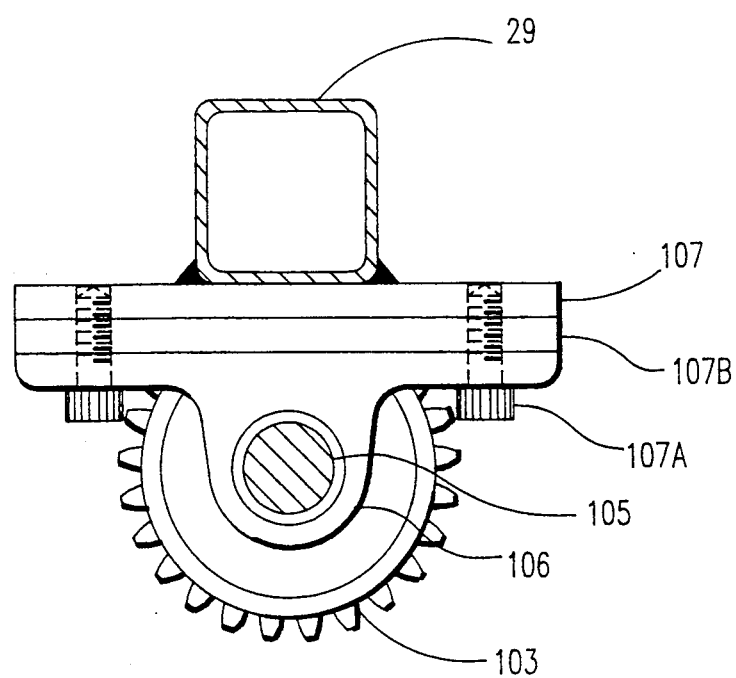
FIG. 6 is an end elevational view, partly in section, of a pillow block bearing mounted on a fixed support frame of the vertical transport apparatus of the present invention.

Each of the pillow block bearings 106 is attached to a plate 107 (see FIG. 6), which is welded to the tube 29, by bolts 107A extending into tapped holes in the plate 107. A plate 107B is disposed between the pillow block bearing 106 and the plate 107 as a spacer. A similar mounting arrangement is provided for the two lower sprockets 103 adjacent the vertical tubes 20 (see FIG. 3B) and 21.

Each of upper sprockets 104 (see FIG. 3A), which receive the chains 102 passing around the lower sprockets 103 (see FIG. 2B) adjacent the vertical tubes 18 and 19, is fixed to a shaft 108 (see FIG. 2A) having its ends supported in pillow block bearings 109 and 110. The pillow block bearing 109 is supported on a horizontal square tube 111, which is welded to the upper end of the vertical tube 18. The pillow block bearing 110 is supported on a horizontal square tube 112, which is welded to the upper end of the vertical tube 19.

The upper shaft 108 (see FIG. 8) is connected by a coupling 113 to an output shaft 114 of a right angle gear box 115. The right angle gear box 115 has its input shaft 116 connected through a coupling 117 to a drive shaft 118. One suitable example of the right angle gear box 115 is sold by Hub City, Aberdeen, S.D. as model 600, style D.

The right angle gear box 115 has a horizontal plate 119 attached to its bottom surface by bolts. The horizontal plate 119 is welded to the upper surface of a plate 120, which has its lower surface welded to the U-shaped tube 25. Thus, the tube 25 supports the right angle gear box 115.

The drive shaft 118 extends through a pillow block bearing 121, which is support by the U-shaped (when viewed from above) square tube 25, and through a gear box 122. The pillow block bearing 121 is attached to a plate 123, which is welded to the tube 25, by bolts 124. One suitable example of the gear box 122 is a gear box sold by Hub City, Aberdeen, S.D. as model 3805-105-2" bore.

A reversible drive motor 125, which has a brake that is automatically effective whenever power is removed, is attached to the gear box 122 and drives the drive shaft 118 through gears in the gear box 122. One suitable example of the reversible drive motor 125 is a reversible motor sold by Reliance Electric Cleveland, Ohio as order No. P14H1962.

The gear box 122 has plates 126 attached to its opposite sides by bolts 127. The plates 126 bear against the tube 25 to prevent turning of the gear box 122.

The blocks 100 (see FIG. 3B) adjacent the vertical tubes 20 and 21 are similarly driven from the reversible drive motor 125 (see FIG. 8) through the gear box 122 and the drive shaft 118. Thus, all four of the chains 102 (see FIG. 2A) are moved simultaneously to lift or lower the tubes 82.

Considering the operation of the present invention, the handrail 16 is beneath the upper surface 86 of the support platform 85 in the lowermost position of each. When a two position key selector switch (not shown), which may be located in the building 97 (see FIG. 1), is activated to start the reversible drive motor 125 by turning the key in one of two directions, the chains 102 (see FIG. 2A) raise the tubes 82.

The two position key selector inactivates the reversible drive motor 125 (see FIG. 1) whenever the key is released. The direction of rotation of the reversible drive motor 125 depends on the direction in which the key of the two position key selector switch is turned.

Since the upper ends of the tubes 82 (see FIG. 9) are engaging the bottom surfaces of the legs 77 and 78 (see FIG. 4) of the handrail 16, the handrail 16 moves upwardly relative to the support platform 85 (see FIG. 2A), which has the wheelchair supported on the substantially flat upper surface 86 with a person in the wheelchair, so that the handrail 16 surrounds the wheelchair on three sides. As shown in FIG. 1, the building 97 is adjacent the fourth side of the support platform 85.

When the handrail 16 (see FIG. 2A) has been moved upwardly a first predetermined distance relative to the support platform 85 and the vertically movable support frame 15 to which the support platform 85 is fixed, each of the blocks 100 (see FIG. 4) on the tubes 82 engages one of the bearing blocks 72 to cause the vertically movable support frame 15 and the support platform 85, which is fixed to the vertically movable support frame 15, to move therewith. The upward vertical movement of the handrail 16 and the support platform 85 continues together until the support platform 85 reaches a desired raised position in which the upper surface 86 (see FIG. 2A) of the support platform 85 is level with the floor or other horizontal surface within the building 97 (see FIG. 1) or other structure so that the wheelchair may be rolled directly from the upper surface 86 (see FIG. 2A) of the support platform 85 to the surface within the building 97 (see FIG. 1) or to a surface exterior of the building 97 that is level with the surface within the building 97.

Upward motion of the handrail 16 (see FIG. 2A), the support platform 85, and the vertical movable support frame 15 is stopped by an upper limit switch 129 (see FIG. 2B), which is mounted on the vertical tube 18 of the fixed support frame 14 by welding, for example, being engaged by a plate 130, which is secured to the horizontal tube 56A of the vertically movable support frame 15. One suitable example of the upper limit switch 129 is a limit switch sold by Cutler-Hammer as model No. E50AR1. The total time to move the handrail 16 (see FIG. 2A) from its lowermost position until the support platform 85 is at its desired raised position is 28.1 seconds with lifting of the handrail 16 alone constituting 12.3 seconds and the movement of the handrail 16 and the vertically movable support frame 15 taking 15.8 seconds.

When the support platform 85 and the handrail 16 are to be lowered to their lowermost positions, the two position key selector switch is again activated to energize the reversible drive motor 125 (see FIG. 1). The key is moved in the opposite direction to reverse the direction of the drive motor 125 so that the chains 102 (see FIG. 2B) are driven in the opposite direction.

As the blocks 100 are driven downwardly, the vertically movable frame structure 15 falls by gravity with the blocks 100 as does the handrail 16 (see FIG. 2A). Downward motion of the vertically movable support frame 15 is stopped when the horizontal tubes 50, (see FIG. 4), 52, 56A, and 56B of the vertically movable support frame 15 engages two stops 131 (see FIG. 1) extending upwardly from each of the tubes 26 (see FIG. 2B) and 27 of the fixed support frame 14.

Figure 2B:
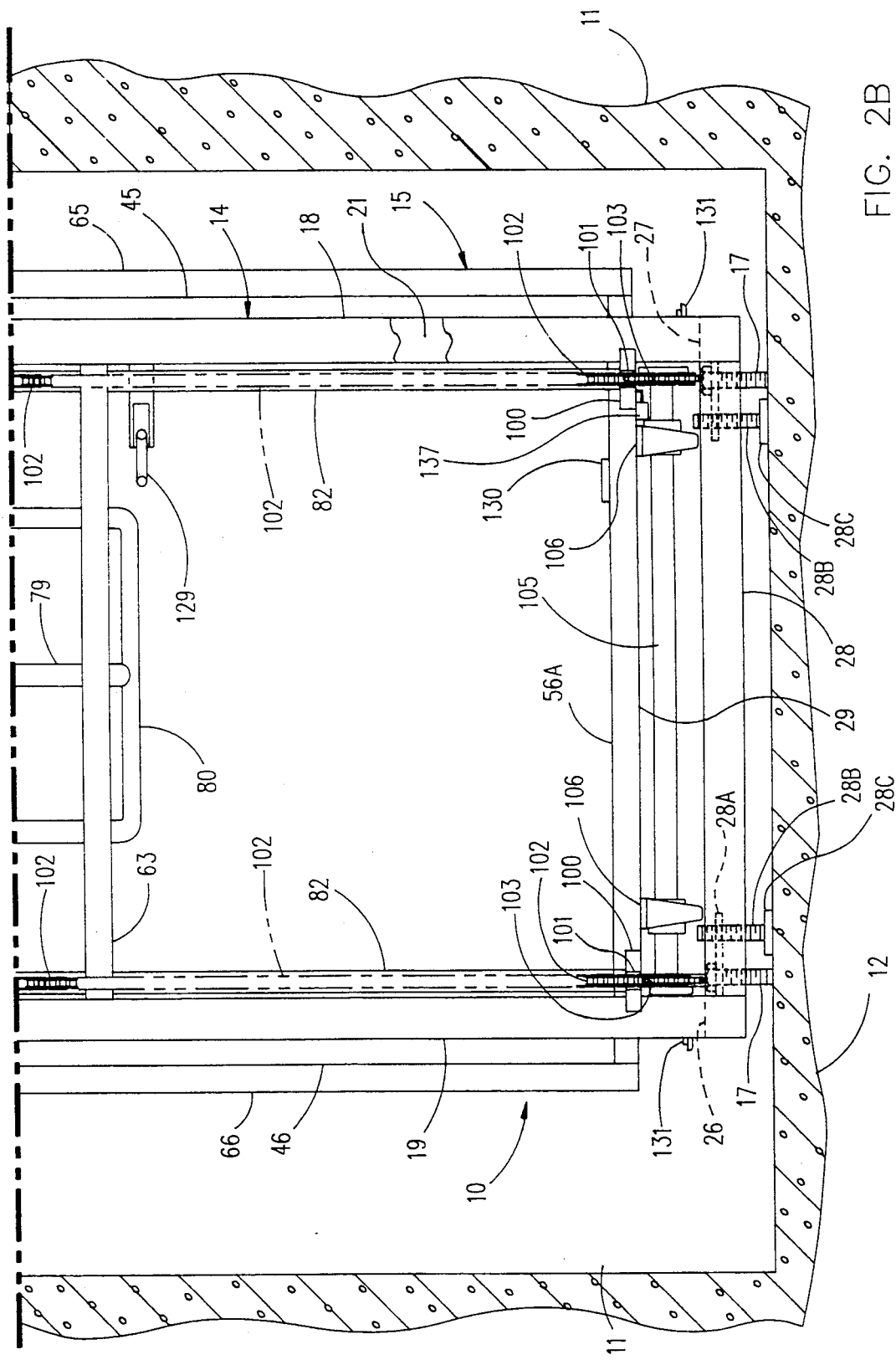

Each of the stops 131 (see FIG. 3B) includes a resilient pad 132 fixed to a metal support 133 having a threaded stud 134 threaded into a tapped hole in a block 135, which is welded to the horizontal tube 26 or 27 (see FIG. 2B). A lock nut 136 (see FIG. 3B) is on the threaded stud 134 and bears against the block 135.

After downward vertical movement of the vertical movable support frame 15 is stopped by the stops 131 on the fixed support frame 14, the handrail 16 (see FIG. 4) continues to fall with the tubes 82 as the chains 102 (see FIG. 3B) continue to move the blocks 100 downwardly. Downward motion of the handrail 16 (see FIG. 4) is stopped by one of the blocks 100 engaging a down limit switch 137 (see FIG. 3B), which is mounted on the horizontal tube 29 of the fixed support frame 14. This insures that the handrail 16 (see FIG. 2A) is not higher than the upper surface 86 of the support platform 85. One suitable example of the lower limit switch 137 (see FIG. 3B) is a limit switch sold by Cutler-Hammer as model No. E50AR1.

If a limb of a person in a wheelchair on the support platform 85 (see FIG. 2A) should become disposed between two of the vertically extending rods 79 (see FIG. 4) during downward movement of the handrail 16, the handrail 16 will cease to move downwardly when the base 76 of one of the legs 77 and 78 of the handrail 16 engages the limb of the person between two of the vertically extending rods 79 of the handrail 16. Therefore, the lack of any connection between each of the posts 81 (see FIG. 9) of the handrail 16 and the receiving tube 82 within which the post 81 is received insures the safety of the user.

All of the square tubes of the fixed support frame 14 (see FIG. 3B) are 3" except the square tubes 29 and 30 which are 2". All of the square tubes of the movable support frame 15 are 2". Each of the base 76 (see FIG. 4), the legs 77 and 78, and the rods 79 and 80 of the handrail 16 has a diameter of 1½" while each of the posts 81 (see FIG. 9) has a diameter of 1". Each of the hollow tubes 82 has an outer diameter of 1½" and an inner diameter of 1⅛".

The platform 85 (see FIG. 1) and the plates 98, 99 (see FIG. 4), and 99′ are ¼" thick. The square tubes 89 are 2".

Figure 10:
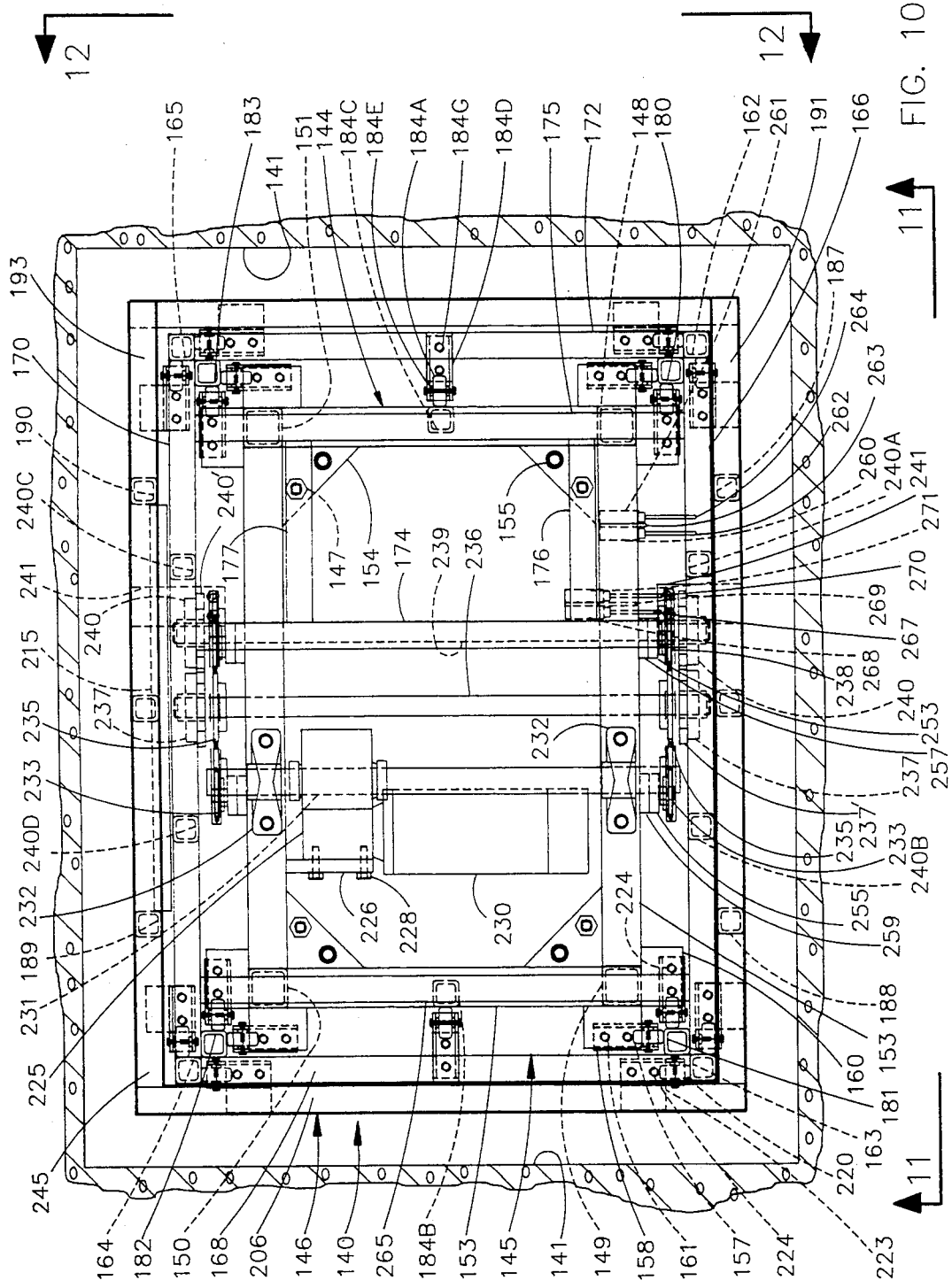
FIG. 10 is a top plan view of another embodiment of the vertical transport apparatus with a support platform and a skirt removed for clarity purposes of the present invention.

Referring to FIG. 10, there is shown a vertical transport apparatus 140. The vertical transport apparatus 140 is disposed within a hole in the ground having concrete vertical walls 141 (see FIG. 11) and a concrete bottom wall 142 forming a concrete pit.

The vertical transport apparatus 140 includes a fixed support frame 144, a vertical movable support frame 145, and a vertically movable U-shaped (when viewed from above) retainer 146, which functions as a handrail. The fixed support frame 144 is secured to the concrete bottom wall 142 by four bolts 147 (see FIG. 10).

When viewed from above as in FIG. 10, the fixed support frame 144 has a substantially rectangular shape. The fixed support frame 144 includes four vertically extending square tubes 148, 149, 150, and 151 forming a rectangular shape when viewed from above. Four lower horizontal square tubes 152 (see FIG. 11) are supported on the concrete bottom wall 142. Each of the lower horizontal square tubes 152 extends between two of the adjacent tubes 148, 149, 150 (see FIG. 10), and 151 and is secured thereto, preferably by welding. The vertical square tubes 148-151 are joined close to their tops, as shown in FIG. 11, by four upper horizontal square tubes 153 being secured thereto, preferably by welding. The four upper horizontal square tubes 153 are parallel to the four lower horizontal square tubes 152.

Each of the four bolts 147 is supported by a triangular shaped plate 154 (see FIG. 10). One of the plates 154 is disposed at each of the four corners formed by the four lower horizontal square tubes 152 and welded thereto.

Each of the plates 154 also supports a jack screw 155 (see FIG. 12) having its bottom end in a counterbore in a metal pad 156 and bearing against the metal pad 156, which rests on the concrete bottom wall 142. The jack screws 155 are used to level the fixed support frame 144 prior to attaching the four bolts 147 to threaded inserts 156′ embedded in the concrete bottom wall The fixed support frame 144 (see FIG. 11) has upper and lower pairs of guide rollers 157 mounted at the exterior of each of its four corners as shown in FIG. 10. As shown in FIG. 11, the upper and lower pairs of the guide rollers 157 are vertically spaced from each other at the exterior of each of the four corners of the fixed support frame 144.

Figure 16:
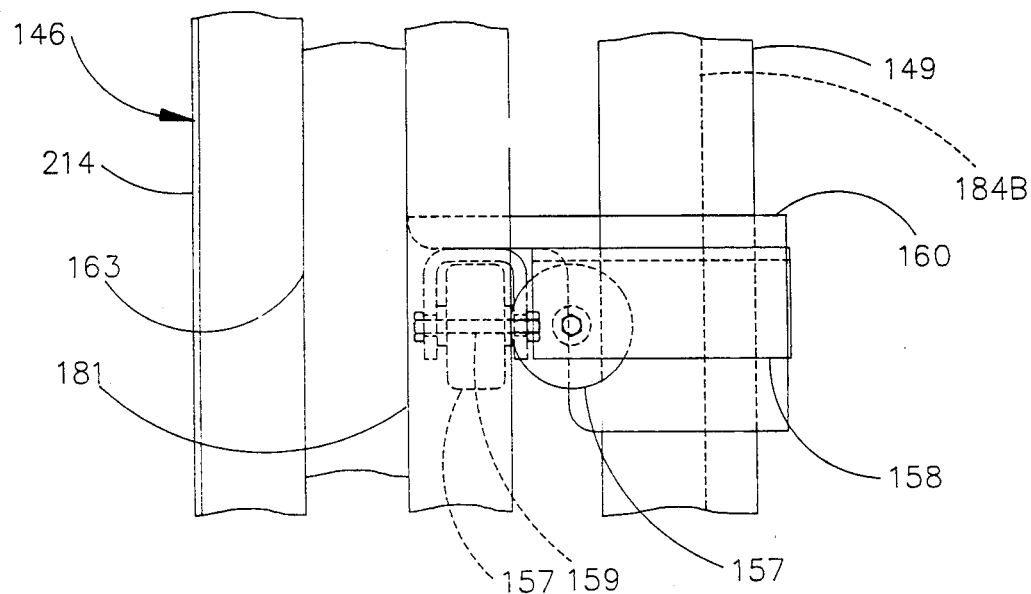
FIG. 16 is an enlarged fragmentary side elevational view of a portion of the vertical transport apparatus of FIG. 11 and showing the mounting arrangement of one pair of guide rollers on the fixed support frame for guiding the vertically movable support frame during its vertical movement.

Each of the guide rollers 157 is rotatably supported in a U-shaped channel support 158 (see FIG. 16) by an axle 159. Each of the U-shaped channel supports 158 is attached to a mounting plate 160 by bolts 161 (see FIG. 10). The mounting plates 160 are fixed, preferably by welding, to the vertical square tubes 148, 149, 150, and 151.

The vertically movable support frame 145 has four vertical square tubes 162, 163, 164, and 165. The vertical square tubes 162 and 163 are connected at their upper ends by an upper horizontal square tube 166 secured thereto, preferably by welding, and at their lower ends by a lower horizontal square tube 167 (see FIG. 11) secured thereto, preferably by welding. Similarly, the upper ends of the vertical square tubes 163 (see FIG. 10) and 164 are connected by an upper horizontal square tube 168 secured thereto, preferably by welding, and their lower ends are joined by a lower horizontal square tube 169 (see FIG. 11) secured thereto, preferably by welding.

The vertical square tubes 164 (see FIG. 10) and 165 are connected at their upper ends by an upper horizontal square tube 170 secured thereto, preferably by welding, and at their lower ends by a lower horizontal square tube 171 (see FIG. 12) secured thereto, preferably by welding. Likewise, the upper ends of the vertical square tubes 162 (see FIG. 10) and 165 are connected by an upper horizontal square tube 172 secured thereto, preferably by welding, and their lower ends are joined by a lower horizontal square tube 173 (see FIG. 12) secured thereto, preferably by welding.

The vertically movable support frame 145 has upper horizontal square tubes 174 (see FIG. 10) and 175 extending between the upper horizontal square tubes 166 and 170 and secured thereto, preferably by welding. Two upper horizontal square tubes 176 and 177 extend between the upper horizontal square tubes 174 and 175 and are secured thereto, preferably by welding. This provides an access opening into the interior of the vertically movable support frame 145 and the fixed support frame 144. A removable trap door (not shown), which may be hingedly mounted, for example, provides access to the opening formed between the upper horizontal square tubes 174-177.

The vertically movable support frame 145 has four additional vertical square tubes 180, 181, 182, and 183, which are adjacent the vertical square tubes 162, 163, 164, and 165, respectively. The vertical square tube 180 is secured, preferably by welding, to the upper horizontal square tubes 166 and 172 and to the lower horizontal square tubes 167 (see FIG. 11) and 173. The vertical square tube 181 (see FIG. 10) is secured, preferably by welding, to the upper horizontal square tubes 166 and 168 and to the lower horizontal square tubes 167 (see FIG. 11) and 169.

The vertical square tube 182 (see FIG. 10) is secured, preferably by welding, to the upper horizontal square tubes 168 and 170 and to the lower horizontal square tubes 169 (see FIG. 11) and 171 (see FIG. 12). The vertical square tube 183 (see FIG. 10) is secured, preferably by welding, to the upper horizontal square tubes 170 and 172 and to the lower horizontal square tubes 171 (see FIG. 12) and 173.

When the vertically movable support frame 145 (see FIG. 10) moves vertically, each of the vertical square tubes 180-183 has two of the vertically spaced rollers 157 riding along two of its adjacent surfaces. Thus, the two vertically spaced pairs of the guide rollers 157 supported at each of the four corners of the fixed support frame 144 cooperate with two adjacent surfaces of one of the vertical square tubes 180-183.

Because the guide rollers 157 initially cooperate only with upper portions of the vertical square tubes 180-183 of the vertically movable support frame 145, the vertically movable support frame 145 has a guide roller 184A supported on each of the lower horizontal square tubes 169 (see FIG. 11) and 173 to prevent any shifting of the bottom of the vertically movable support frame 145 during its vertical movement. The guide roller 184A on the lower horizontal square tube 169 rides on an outer surface of a vertical square tube 184B, which extends between one of the upper horizontal square tubes 153 of the fixed support frame 144 and one of the lower horizontal square tubes 152 of the fixed support frame 144 and is secured thereto, preferably by welding. The guide roller 184A on the lower horizontal square tube 173 rides on another surface of a vertical square tube 184C, which extends between another of the upper horizontal square tubes 153 and another of the lower horizontal square tubes 152 and is secured thereto, preferably by welding.

Each of the guide rollers 184A is rotatably supported in a U-shaped channel support 184D (see FIG. 10) by an axle 184E. Each of the U-shaped channel supports 184D is attached to a mounting plate 184F (see FIG. 11) by bolts 184G (see FIG. 10). The mounting plates 184F (see FIG. 11) are fixed, preferably by welding, to the horizontal square tubes 169 and 173.

The vertically movable support frame 145 has a support platform 185, which has a thickness of ¼", mounted on its upper end and fixed to the upper ends of the vertical square tubes 162-165 (see FIG. 10) and 180-183 and the upper horizontal square tubes 166, 168, 170, and 172. The support platform 185 has a substantially flat surface 186 (see FIG. 11) supporting the wheelchair and a person in it. The support platform 185 has an opening formed therein to receive the trap door (not shown), which covers the opening defined by the upper horizontal square tubes 174 (see FIG. 10), 175, 176, and 177. When the support platform 185 is in its uppermost position, the substantially flat upper surface 186 (see FIG. 11) extends to the building 97 (see FIG. 1) having the surface with which the substantially flat upper surface 186 (see FIG. 11) is desired to be substantially level to allow transfer of the wheelchair and the person in it between the vertical transport apparatus 140 and the building 97 (see FIG. 1).

The support platform 185 (see FIG. 11) has its two sides and its rear surrounded by the U-shaped retainer 146. The U-shaped retainer 146 includes four vertical square tubes 187 (see FIG. 10), 188, 189, and 190 having a rectangular shape when viewed from above. The upper ends of the vertical square tubes 187 and 188 have an upper horizontal square 191 secured thereto, preferably by welding, and extending beyond each of the vertical square tubes 187 and 188. The lower ends of the vertical square tubes 187 and 188 have a lower horizontal square tube 192 (see FIG. 11) secured thereto, preferably by welding, and extending beyond each of the vertical square tubes 187 and 188.

The upper ends of the vertical square tubes 189 (see FIG. 10) and 190 have an upper horizontal square tube 193 secured thereto, preferably by welding, and extending beyond each of the vertical square tubes 189 and 190. The lower ends of the vertical square tubes 189 and 190 have a lower horizontal square tube 194 (see FIG. 11) secured thereto, preferably by welding, and extending beyond each of the vertical square tubes 189 and 190.

A horizontal square tube 195 extends between the vertical square tubes 187 and 188 and is secured to each, preferably by welding. A vertical square tube 196 extends between the horizontal square tube 195 and the lower horizontal square tube 192 and is secured to each, preferably by welding.

A horizontal square tube 197, which is in the same horizontal plane as the horizontal square tube 195, extends between the vertical square tubes 189 and 190 and is secured to each, preferably by welding. A vertical square tube 198, which is in the same vertical plane as the vertical square tube 196, extends between the horizontal square tube 197 and the lower horizontal tube 194 and is secured to each, preferably by welding. The square shaped tubes 195, 196, 197, and 198 cooperate to prevent bowing of the lower horizontal square tubes 192 and 194 due to forces exerted thereon during lifting of the U-shaped retainer 146.

A lower horizontal square tube 199 extends between the lower horizontal square tubes 192 and 194 and is secured to each, preferably by welding. The vertical square tube 187 has an intermediate horizontal square tube 200 secured thereto, preferably by welding, and extending forwardly therefrom substantially parallel to the lower horizontal square tube 192. The vertical square tube 190 (see FIG. 12) has an intermediate square tube 201 secured thereto, preferably by welding, and extending forwardly therefrom for the same distance as the intermediate horizontal square tube 200 extends from the vertical square tube 187. The forward ends of the intermediate horizontal square tubes 200 and 201 are joined together, preferably by welding, by an intermediate square tube 202. Thus, an intermediate U-shaped support 203 is provided between the vertical square tubes 187 and 190 by the intermediate square tubes 200-202.

The rear ends of the upper horizontal square tubes 191 (see FIG. 10) and 193 have an upper horizontal square tube 206 extending therebetween and secured thereto, preferably by welding. The rear ends of the lower horizontal square tubes 192 (see FIG. 11) and 194 are joined together by a lower horizontal square tube 209, preferably by welding.

The vertical square tube 188 has an intermediate horizontal square tube 210 secured thereto, preferably by welding, and extending rearwardly therefrom. The vertical square tube 189 (see FIG. 10) has an intermediate horizontal square tube 211 (see FIG. 11) secured thereto, preferably by welding, and extending rearwardly therefrom. The rear ends of the intermediate horizontal square tubes 210 and 211 are connected to each other by an intermediate horizontal square tube 212 extending therebetween and secured to each, preferably by welding. The intermediate horizontal square tubes 210-212 form an intermediate U-shaped support 213.

Each of the sides and the rear of the U-shaped retainer 146 has a sheet metal panel 214 (see FIG. 18) of ⅛" thickness extending on the inside from the top to the bottom. On the outside, the sheet metal panel 214 extends from the top to beyond the bottom of the U-shaped retainer 146. Therefore, only the front of the U-shaped retainer 146 is open and this is to enable a wheelchair to be rolled onto the support platform 185 (see FIG. 11). The U-shaped retainer 146 has one of the sheet metal panels 214 (see FIG. 18) of ⅛" thickness extending from the front of the intermediate horizontal square tube 202 (see FIG. 11) and the front ends of the intermediate horizontal tubes 200 and 201 to beyond the lower horizontal square tube 199.

As shown in FIG. 10, the U-shaped retainer 146 has a grip rail 215 extending between the vertical square tubes 189 and 190. As shown in FIG. 12, the grip rail 215 is formed by rolling over the inner sheet metal panel 214 (see FIG. 18) between the vertical square tubes 189 (see FIG. 10) and 190.

Each of the intermediate U-shaped supports 203 (see FIG. 11) and 213 has two pairs of guide rollers 220 supported thereon. One pair of the guide rollers 220 on the intermediate U-shaped support 203 has one of the guide rollers 220 supported on the intermediate horizontal square tube 200 and the other of the guide rollers 220 supported on the intermediate horizontal square tube 202. The other pair of the guide rollers 220 supported on the intermediate U-shaped support 203 has one of the guide rollers 220 supported by the intermediate horizontal square tube 202 and the other of the guide rollers 220 supported by the intermediate horizontal square tube 201 (see FIG. 12).

One pair of the guide rollers 220 on the intermediate U-shaped support 213 (see FIG. 11) has one of the guide rollers 220 supported by the intermediate horizontal square tube 210 and the other of the guide rollers 220 supported by the intermediate horizontal square tube 212. The other pair of the guide rollers 220 supported by the intermediate U-shaped support 213 has one of the guide rollers 220 supported by the intermediate horizontal square tube 211 and the other of the guide rollers 220 supported by the intermediate horizontal square tube 212.

Four additional lower pairs of the guide rollers 220 are spaced vertically beneath the four pairs of the guide rollers 220 supported by the intermediate U-shaped supports 203 and 213. A first pair of the four lower pairs of the guide rollers 220 has one of the guide rollers 220 supported by the lower horizontal square tube 192 and the other of the guide rollers 220 supported by the lower horizontal square tube 199. A second pair of the four lower pairs of the guide rollers 220 has one of the guide rollers 220 supported on the lower horizontal square tube 194 (see FIG. 12) and the other of the guide rollers 220 supported on the lower horizontal square tube 199.

A third pair of the lower four pairs of the guide rollers 220 has one of the guide rollers 220 supported on the lower horizontal square tube 194 (see FIG. 11) and the other of the guide rollers 220 supported on the lower horizontal square tube 209. A fourth pair of the lower pairs of the guide rollers 220 has one of the guide rollers 220 supported on the lower horizontal square tube 192 and the other of the guide rollers 220 supported on the lower horizontal square tube 209.

As shown in FIG. 10, the vertically spaced pairs of the guide rollers 220 ride on two adjacent surfaces of each of the four vertical square tubes 162-165 of the vertically movable support frame 145. Thus, two of the vertically spaced guide rollers 220 ride on each of the two adjacent surfaces of each of the four vertical square tubes 162-165.

Each of the guide rollers 220 (see FIG. 17) is rotatably supported in a U-shaped channel support 221 by an axle 222. Each of the U-shaped channels 221 is attached to a mounting plate 223 by bolts 224 (see FIG. 10). The mounting plates 223 (see FIG. 11) are welded to the intermediate U-shaped supports 203 and 213 and to the lower horizontal square tubes 192, 194, 199, and 209.

A gear box 225 (see FIG. 10), which is preferably the same as the gear box 122 (see FIG. 1), is supported by the fixed support frame 144 (see FIG. 10). The gear box 225 is supported on one of the upper horizontal square tubes 153 of the fixed support frame 144 by a mounting plate 226 (see FIG. 11). The mounting plate 226 is secured by bolts 228 to the gear box 225 and is welded to one of the upper horizontal square tubes 153 of the fixed support frame 144.

A reversible drive motor 230, which is preferably the same as the motor 125 (see FIG. 1), is supported by the gear box 225 (see FIG. 10). The motor 230 drives a drive shaft 231 extending through the gear box 225 and supported in pillow block bearings 232, which are mounted on two of the upper horizontal square tubes 153 of the fixed support frame 144.

Each end of the drive shaft 231 has a chain sprocket 233 attached thereto. Each of the chain sprockets 233 has a single continuous chain 234 (see FIG. 11) passing therearound.

Each of the chains 234 extends from one side of the chain sprocket 233 to a chain sprocket 235. Each of the chain sprockets 235 is mounted on a shaft 236 (see FIG. 10) having its opposite ends rotatably supported in pilot flanged bearings 237, which are supported in and bolted to vertically extending plates 237' fixed to the lower horizontal square tubes 167 (see FIG. 11) and 171 (see FIG. 12) of the vertically movable support frame 145.

After each of the chains 234 (see FIG. 11) passes around the chain sprocket 235, each of the chains 234 passes around a chain sprocket 238. Each of the chain sprockets 238 is mounted on a shaft 239, which has its opposite ends rotatably supported in pilot flanged bearings 240 (see FIG. 10). The bearings 240 are supported in and bolted to vertically extending plates 240' fixed to the upper horizontal square tubes 166 and 170 of the vertically movable support frame 145.

To prevent bowing of the upper horizontal square tubes 166 and 170, which support the chain sprockets 238, and the lower horizontal square tubes 167 (see FIG. 12) and 171, which support the chain sprockets 235 (see FIG. 10), two vertical square tubes 240A and 240B extend between the upper horizontal square tube 166 and the lower horizontal square tube 167 (see FIG. 12) and two vertical square tubes 240C (see FIG. 10) and 240D extend between the upper horizontal square tube 170 and the lower horizontal square tube 171 (see FIG. 12). The vertical square tubes 240A (see FIG. 10) and 240B are secured to the upper horizontal square tube 166 and the lower horizontal square tube 167 (see FIG. 12), preferably by welding. The vertical square tubes 240C (see FIG. 10) and 240D are similarly secured to the upper horizontal square tube 170 and the lower horizontal square tube 171 (see FIG. 12).

After each of the chains 234 (see FIG. 11) passes around one of the chain sprockets 238, the end of the chain 234 is adjustably attached to a lift block 241. One of the lift blocks 241 is secured, preferably by welding, to the lower horizontal square tube 192 of the U-shaped retainer 146 while the other of the lift blocks 241 is secured, preferably by welding, to the lower horizontal square tube 194 of the U-shaped retainer 146.

Figure 15:
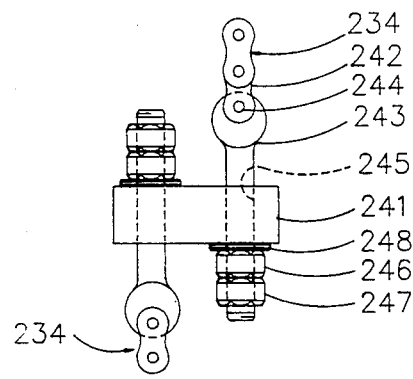
FIG. 15 is an enlarged fragmentary side elevational view of a portion of the vertical transport apparatus of FIG. 11 and showing the ends of a drive chain connected to a lift block carried on the retainer of the vertical transport apparatus.

The chain 234 has one of its end links 242 (see FIG. 15) attached to one end of a threaded stud 243 by a pin 244. The threaded stud 243 extends through a passage 245 in the lift block 241 and is retained therein by a pair of nuts 246 and 247 with a washer 248 disposed between the nut 246 and the lift block 241. Thus, the position of the threaded stud 243 within the lift block 241 adjusts the location of the one end of the chain 234.

Each of the chains 234 (see FIG. 11) has its other end similarly connected to the lift block 241. The other end of each of the chains 234 passes around two idler chain sprockets 250 and 251 prior to returning to the chain sprocket 233.

Each of the idler chain sprockets 250 and 251 is supported by the fixed support frame 144. Each of the idler chain sprockets 250 is rotatably supported on a rod 252 extending from a vertically extending plate 253, and each of the idler chain sprockets 251 is rotatably supported on a rod 254 extending from a vertically extending plate 255.

Each of the two plates 253 is connected by bolts 256 to a vertically extending plate 257 (see FIG. 18), and each of the two plates 255 (see FIG. 11) is connected by bolts 258 to a vertically extending plate 259 (see FIG. 10). One of the two plates 257 and one of the two plates 259 are secured to one of the lower horizontal square tubes 152 (see FIG. 12) of the fixed support frame 144. The other of the two vertically extending plates 257 (see FIG. 10) and the other of the two vertically extending plates 259 are supported on another of the lower horizontal square tubes 152 (see FIG. 12).

Considering the operation of the present invention, neither the U-shaped retainer 146 nor the flat upper surface 186 (see FIG. 11) of the support platform 185 is above the ground in the lowermost position of each. When a two-position key selector switch (not shown), which may be located in the building 97 (see FIG. 1), is activated to start the reversible drive motor 230 (see FIG. 11) by turning the key in one of two directions, the sprockets 233 are rotated counterclockwise (as viewed in FIG. 11) to cause the chains 234 to raise the U-shaped retainer 146.

The two-position key selector inactivates the reversible drive motor 230 whenever the key is released. The direction of rotation of the reversible drive motor 230 depends on the direction in which the key of the two-position key selector switch is turned.

When the U-shaped retainer 146 is moved upwardly relative to the support platform 185, which has the wheelchair supported on the substantially flat upper surface 186 with a person in the wheelchair, the U-shaped retainer 146 surrounds the wheelchair on three sides. The open front end of the U-shaped retainer will be facing towards the building 97 (see FIG. 1).

Figure 13:
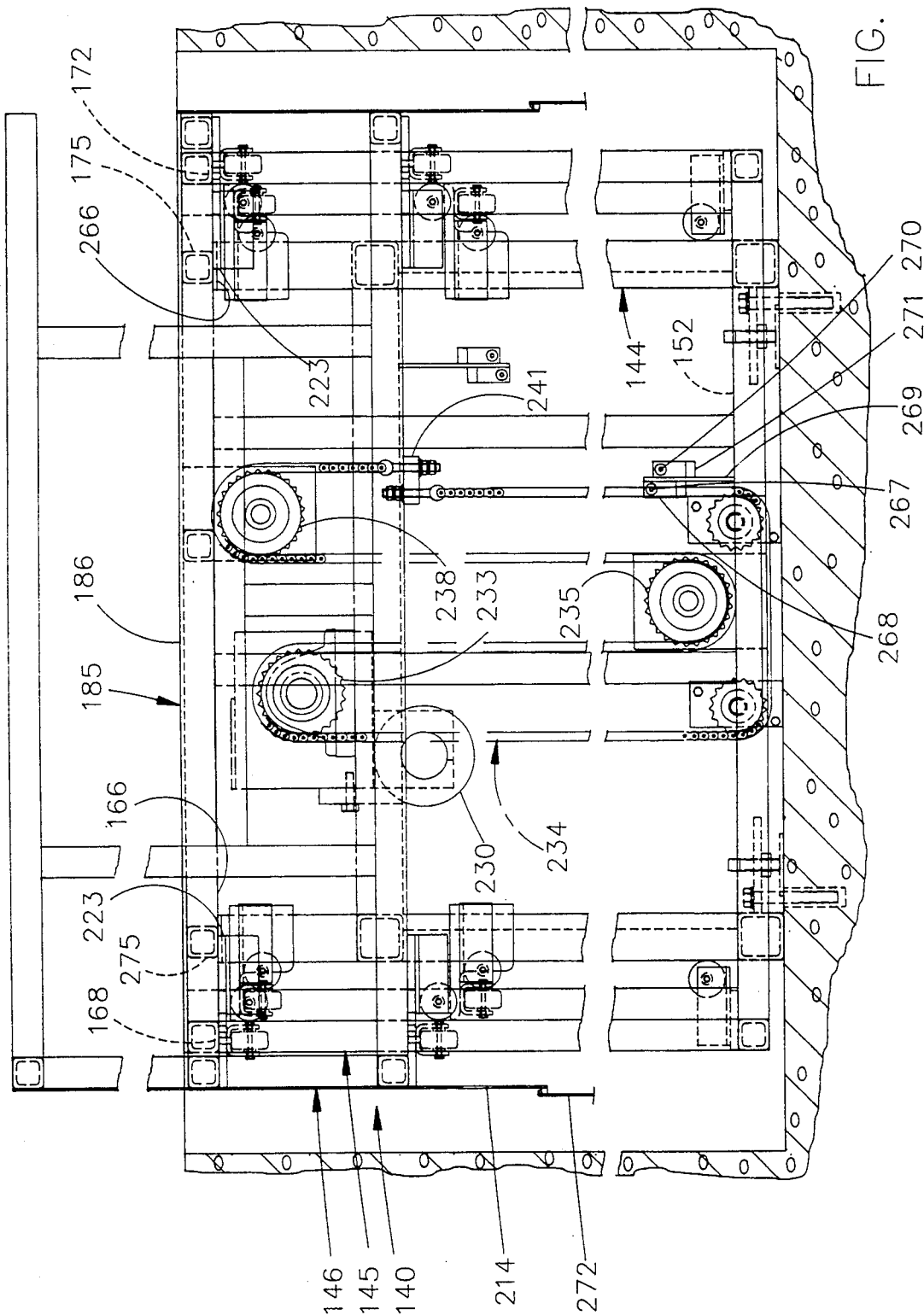
FIG. 13 is a fragmentary side elevational view of the vertical transport apparatus, similar to FIG. 11, with the retainer raised relative to a vertically movable support frame.

When the U-shaped retainer 146 (see FIG. 11) has been moved upwardly a first predetermined distance relative to the support platform 185 and the vertically movable support frame 145 to which the support platform 185 is fixed, the guide roller mounting plates 223, which are attached to the intermediate U-shaped supports 203 and 213, engage the upper horizontal square tubes 166, 168 (see FIG. 10), 170, and 172 of the vertically movable support frame 145 as shown in FIG. 13. When the mounting plates 223 engage the four corners of the vertically movable support frame 145, there is no further upward movement of the U-shaped retainer 146 relative to the vertically movable support frame 145.

As a result, the continued counterclockwise (as viewed in FIG. 13) rotation of the chain sprockets 233 by the motor 230 causes simultaneous lifting of the U-shaped retainer 146 and the vertically movable support frame 145. The vertically movable support frame 145 is lifted by the chains 234 causing the sprockets 233 to be pulled upwardly. This also causes the sprockets 238, which are also mounted on the vertically movable support frame 145, to be raised upwardly. At the same time, the chains 234 exert an upward force on the U-shaped retainer 146 through the lift blocks 241 to cause lifting of the U-shaped retainer 146 with the vertically movable support frame 145.

The upward vertical movement of the vertically movable support frame 145 and the U-shaped retainer 146 continues together until the support platform 185 reaches the desired raised position in which the substantially flat support surface 186 of the support platform 185 is level with the floor or other horizontal surface within the building 97 (see FIG. 1) or other structure. This enables the wheelchair to be rolled directly from the substantially flat support surface 186 (see FIG. 14) of the support platform 185 to the surface within the building 97 (see FIG. 1) or to a surface exterior of the building 97 that is level with the surface within the building 97.

Figure 14:
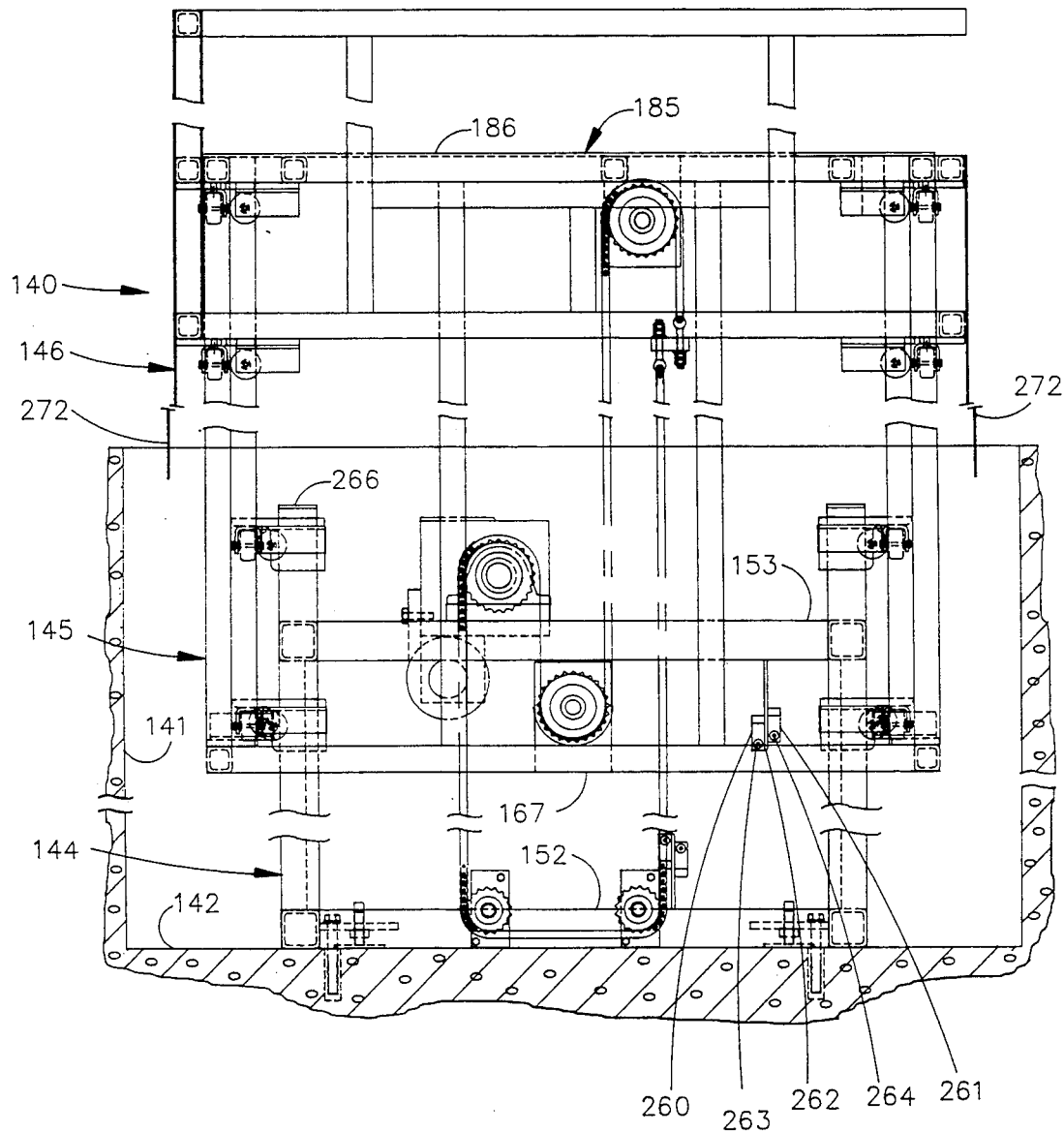
FIG. 14 is a fragmentary side elevational view of the vertical transport apparatus, similar to FIGS. 11 and 13, with the vertically movable support frame in its uppermost position.

Upward motion of the vertically movable support frame 145 and the U-shaped retainer 146 is stopped in the position of FIG. 14 by one of two upper limit switches 260 and 261, which are mounted on a vertically extending plate 262 secured to one of the upper horizontal square tubes 153 of the fixed support frame 144, preferably by welding. One of the upper limit switches 260 and 261 has its fingers 263 and 264, respectively, engaged by the upper surface of the lower horizontal square tube 167 of the vertically movable support frame 145. Each of the upper limit switches 260 and 261 may be the same as the upper limit switch 129 (see FIG. 2B).

Because the finger 263 of the upper limit switch 260 is lower than the finger 264 of the upper limit switch 261, the upper limit switch 260 normally stops the upward motion of the vertically movable frame 145 and the U-shaped retainer 146 when the finger 263 is engaged by the upper surface of the lower horizontal square tube 167 of the vertically movable support frame 145. If the upper limit switch 260 should fail for any reason, the engagement of the finger 264 of the upper limit switch 261 by the upper surface of the lower horizontal square tube 167 of the vertically movable frame 145 stops the upward motion of the vertically movable frame 145 and the U-shaped retainer 146.

When the support platform 185 (see FIG. 11) and the U-shaped retainer 146 are to be lowered to their lowermost positions, the two-position key selector switch is again activated to energize the reversible drive motor 230. The key is moved in the opposite direction to reverse the direction of rotation of the drive motor 230 so that the chains 234 are driven in the opposite direction.

As the lift blocks 241 are driven downwardly, the U-shaped retainer 146 falls by gravity. The vertically movable support frame 145 is lowered at the same time through the chain sprockets 235 and 238 being lowered.

Downward motion of the vertically movably support frame 145 is stopped when the upper horizontal square tube 175 and the upper horizontal square tube 265, which extends between the upper horizontal square tubes 166 (see FIG. 10) and 170 and is secured thereto, preferably by welding, engage an elastomeric element 266 (see FIG. 11) on the upper end of each of the four vertical square tubes 148 (see FIG. 10), 149, 150, and 151 of the fixed support frame 144.

After downward movement of the vertically movable support frame 145 is stopped as shown in FIG. 13, the U-shaped retainer 146 continues to fall by gravity as the chains 234 continue to allow the lift blocks 241 to move downwardly. Downward motion of the U-shaped retainer 146 is stopped by one of the lift blocks 241 on the U shaped retainer 146 engaging a finger 267 of a down or lower limit switch 268, which is mounted on a vertically extending plate 269 secured, preferably by welding, to one of the lower horizontal square tubes 152 of the fixed support frame 144. If the down limit switch 268 should fail, then the lift block 241 engages a finger 270 of a down limit switch 271, which is mounted on the plate 269 at a slightly lower level than the down limit switch 268.

This insures that the U-shaped retainer 146 is not higher than the substantially flat support surface 186 (see FIG. 11) of the support platform 185. Each of the lower limit switches 268 (see FIG. 13) and 271 may be the same as the down or lower limit switch 137 (see FIG. 3B).

While the sheet metal panels 214 (see FIG. 18) completely enclose the sides and the rear of the U-shaped retainer 146 and the lower front portion of the U-shaped retainer 146 to form a rectangular shaped enclosure or skirt for the U-shaped retainer 146, a portion of the vertically movable frame 145 is disposed above the ground when the vertically movable frame 145 is in its uppermost position as shown in FIG. 14. In this position, the portion of the vertically movable frame 145 disposed above the ground is enclosed by a rectangular shaped metal skirt 272 (see FIG. 19), which is formed by four sheet metal panels of ⅛" thickness preferably welded to each other.

The upper end of each of the four sides of the skirt 272 has a rod 273, which is preferably ¼" in diameter, secured to its inner surface, preferably by welding, for its entire horizontal length. A square rod 274, which preferably has a square cross section with each side being ⅜", extends along the entire bottom end of the outer surface of each of the sheet metal panels 214 forming the four sides of the skirt for the U-shaped retainer 146 and is secured thereto, preferably by welding.

During the upward movement of the U-shaped retainer 146 to its position of FIG. 13, the rods 274 (see FIG. 19) on the bottom ends of the sheet metal panels 214 engage the rods 273 on the skirt 272 to start upward movement of the skirt 272, which has a vertical length of 21". Each of the sheet metal panels 214 (see FIG. 19) is disposed only ½" from the concrete bottom wall 142 (see FIG. 18) when the U-shaped retainer 146 is in its lowermost position as shown in FIG. 11.

When the vertically movable frame 145 and the U-shaped retainer 146 are moved from their positions of FIG. 13 to their positions in FIG. 14, the engagement of the four rods 274 (see FIG. 19) on the bottom ends of the sheet metal panels 214 with the four rods 273 on the skirt 272 causes continued lifting of the skirt 272. This raises the skirt 272 so that the skirt 272 encloses the portion of the vertically movable frame 145 above the ground in the uppermost position of the vertically movable frame 145.

The bottom end of the skirt 272 rests on the concrete bottom wall 142 (see FIG. 18) until the rods 273 (see FIG. 19) are engaged by the rods 274 during upward movement of the U-shaped retainer 146. Thus, the skirt 272 has a vertical length that also encloses 2⅜" of the vertically movable frame 145 below the ground when the vertically movable frame 145 is in its uppermost position as shown in FIG. 14.

All of the square tubes of the fixed support frame 145 (see FIG. 11) are 3" except for the square tubes 184B (see FIG. 10) and 184C, which are 2". All of the square tubes of the vertically movable support frame 145 and the U-shaped retainer 146 are 2".

It should be understood that the substantially flat support 186 (see FIG. 11) of the support platform 185 may have an aesthetic structure thereon. For example, bricks could be supported on the substantially flat support surface 186 of the support platform 185. This would necessitate increasing the lengths of the vertical square tubes 187-190 (see FIG. 10) of the U-shaped retainer 146. This would result in the U-shaped retainer 146 having its uppermost surface not higher than the ground or the bricks supported on the substantially flat support surface 186 (see FIG. 11) of the support platform 185 when the U-shaped retainer 146 is in its lowermost position but higher than the substantially flat support surface 186 of the support platform 185.

An advantage of this invention is that it is easily installed relative to an existing structure to enable transport of a person in a wheelchair between two vertical positions. Another advantage of this invention is that retaining means are positioned prior to raising the person in the wheelchair while the retaining means are stored out of sight when not in use. A further advantage of this invention is that it can be easily used where a ramp cannot be installed.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

We claim:

1. A vertical transport apparatus for transporting a person from a ground level position to a raised position and vice versa including:

movable support means for supporting a person including a support surface not disposed above the ground when said movable support means is in its lowermost position;

retaining means surrounding at least a portion of said support surface of said movable support means for retaining the person on said support surface of said movable support means, said retaining means having no portion disposed above the ground when said retaining means is in its lowermost position;

first causing means for causing lifting of said retaining means relative to said movable support means for a first predetermined distance to dispose said retaining means in a raised position relative to said support surface of said movable support means;

and second causing means for causing lifting of said movable support means and said retaining means for a second predetermined distance to their uppermost positions after said retaining means has been lifted the first predetermined distance relative to said movable support means, said support surface of said movable support means being substantially level with a surface of another structure when said retaining means and said movable support means are in their uppermost positions.

2. The apparatus according to claim 1 including:
a fixed support frame disposed in a hole in the ground;
and said fixed support frame including guide means for guiding said movable support means for substantially vertical movement relative to said fixed support frame during movement of said movable support means from its lowermost position to its uppermost position and vice versa.

3. The apparatus according to claim 2 including second guide means on at least one of said retaining means and said movable support means for guiding said retaining means on said movable support means during vertical movement of said retaining means relative to said movable support means.

4. The apparatus according to claim 3 in which:
said first causing means includes driving means connected to said retaining means to move said retaining means upwardly relative to said movable support means for the first predetermined distance;
and said second causing means includes cooperating means driven by said driving means for cooperating with said movable support means when said retaining means has been moved the first predetermined distance by said driving means to cause movement of said movable support means and said retaining means together for the second predetermined distance by said driving means.

5. The apparatus according to claim 4 in which said driving means includes:
motive means;
and transmitting means for transmitting drive from said motive means to at least opposite sides of said retaining means.

6. The apparatus according to claim 5 in which said movable support means includes:
a frame having a platform mounted on its top;
and said platform having a support surface forming said support surface of said movable support means.

7. The apparatus according to claim 6 in which said transmitting means of said driving means includes:
at least one drive transmitting chain connected to each of the opposite sides of said retaining means;
and drive supply means for supplying drive from said motive means to each of said drive transmitting chains.

8. The apparatus according to claim 6 in which said transmitting means of said driving means includes:
a first drive transmitting chain connected to one of the opposite sides of said retaining means;
a second drive transmitting chain connected to the other of the opposite sides of said retaining means;
and drive supply means for supplying drive from said motive means to each of said first and second drive transmitting chains.

9. The apparatus according to claim 5 in which said transmitting means of said driving means includes:
at least one drive transmitting chain connected to each of the opposite sides of said retaining means;
and drive supply means for supplying drive from said motive means to each of said drive transmitting chains.

10. The apparatus according to claim 2 in which:
said first causing means includes driving means connected to said retaining means to move said retaining means upwardly relative to said movable support means for the first predetermined distance;
and said second causing means includes cooperating means driven by said driving means for cooperating with said movable support means when said retaining means has been moved the first predetermined distance by said driving means to cause said movable support means to be moved with said retaining means for the second predetermined distance by said driving means.

11. The apparatus according to claim 10 in which said driving means includes:
motive means supported by said fixed support frame;
and transmitting means for transmitting drive from said motive means to at least opposite sides of said retaining means.

12. The apparatus according to claim 10 including:
said second causing means enabling said movable support means and said retaining means to be lowered the second predetermined distance from their uppermost positions;
stopping means for stopping only said movable support means after said movable support means and said retaining means have been lowered the second predetermined distance from their uppermost positions so that said movable support means is in its lowermost position;
and said first causing means enabling said retaining means to be lowered the first predetermined distance to its lowermost position after said stopping means has stopped said movable support means at its lowermost position.

13. The apparatus according to claim 2 including:
said second causing means enabling said movable support means and said retaining means to be lowered the second predetermined distance from their uppermost positions;
stopping means for stopping only said movable support means after said movable support means and said retaining means have been lowered the second predetermined distance from their uppermost positions so that said movable support means is in its lowermost position;
and said first causing means enabling said retaining means to be lowered the first predetermined distance to its lowermost position after said stopping means has stopped said movable support means at its lowermost position.

14. The apparatus according to claim 1 in which:
said first causing means includes driving means connected to said retaining means to move said retaining means upwardly relative to said movable support means for the first predetermined distance;
and said second causing means includes cooperating means driven by said driving means for cooperating with said movable support means when said retaining means has been moved the first predetermined distance by said driving means to cause movement of said movable support means and said retaining means together for the second predetermined distance by said driving means.

15. The apparatus according to claim 14 including:

a fixed support frame disposed in a hole in the ground;

and said driving means including:

motive means supported by said fixed support frame;

and transmitting means for transmitting drive from said motive means to at least opposite sides of said retaining means.

16. The apparatus according to claim 14 including:

said second causing means enabling said movable support means and said retaining means to be lowered the second predetermined distance from their uppermost positions;

stopping means for stopping only said movable support means after said movable support means and said retaining means have been lowered the second predetermined distance from their uppermost positions so that said movable support means is in its lowermost position;

and said first causing means enabling said retaining means to be lowered the first predetermined distance to its lowermost position after said stopping means has stopped said movable support means at its lowermost position.

17. The apparatus according to claim 14 including:

a fixed support frame disposed in a hole in the ground;

and said driving means including:

motive means supported by said fixed support frame;

and transmitting means for transmitting drive from said motive means to at least opposite sides of said retaining means;

said transmitting means of said drive means including:

a first drive transmitting chain connected to one of the opposite sides of said retaining means;

a second drive transmitting chain connected to the other of the opposite sides of said retaining means;

drive supply means for supplying drive from said motive means to each of said first and second drive transmitting chains;

and a pair of chain sprockets mounted on each of the opposite sides of said movable support means and having one of said first and second drive transmitting chains pass therearound prior to connecting said drive transmitting chain to one of the opposite sides of said retaining means whereby said first and second drive transmitting chains lift said movable support means and said retaining means the second predetermined distance together when said retaining means engages said movable support means after said retaining means has been moved the first predetermined distance by said motive means.

18. The apparatus according to claim 1 including:

said second causing means enabling said movable support means and said retaining means to be lowered the second predetermined distance from their uppermost positions;

stopping means for stopping only said movable support means after said movable support means and said retaining means have been lowered the second predetermined distance from their uppermost positions so that said movable support means is in its lowermost position;

and said first causing means enabling said retaining means to be lowered the first predetermined distance to its lowermost position after said stopping means has stopped said movable support means at its lowermost position.

19. A vertical transport apparatus for transporting a person between lower and upper vertically spaced positions including:

a movable frame having a platform adjacent its top;

said platform providing a support surface at the lower position when said movable frame is in its lowermost position;

a fixed frame hidden from view and disposed lower than the lower position;

said movable frame being supported by said fixed frame for substantially vertical movement relative thereto;

a U-shaped handrail supported by said movable frame for substantially vertical movement relative thereto;

said U-shaped handrail including:

a base;

and a pair of substantially parallel sides extending substantially perpendicular to said base;

said U-shaped handrail being disposed no higher than the lower position when each of said U-shaped handrail and said movable frame is in its lowermost position;

drive means for raising and lowering said U-shaped handrail a first predetermined distance relative to said movable frame, said U-shaped handrail being disposed in a raised position relative to said platform after said U-shaped handrail is raised the first predetermined distance from its lowermost position;

said U-shaped handrail surrounding at least a portion of opposite sides of said support surface of said platform and an end of said support surface of said platform when said U-shaped handrail is in its raised position relative to said platform;

said drive means including first cooperating means for cooperating with said U-shaped handrail to raise and lower said U-shaped handrail relative to said movable frame;

second cooperating means for cooperating with said movable frame after said U-shaped handrail has been raised the first predetermined distance to cause movement of said movable frame and said U-shaped handrail by said drive means for a second predetermined distance to dispose said movable frame in its maximum raised position in which said support surface of said platform is at the upper position at which said support surface of said platform is substantially level with a surface of a structure to which a person on said support surface of said platform is to transfer;

said drive means lowering said U-shaped handrail and said movable frame the second predetermined distance after said U-shaped handrail and said movable frame have been raised the second predetermined distance;

and said fixed frame having stopping means for stopping downward movement of only said movable frame after said U-shaped handrail and said movable frame have been lowered the second predetermined distance from their uppermost positions while allowing said drive means to lower said U-shaped handrail the first predetermined distance to its lowermost position to dispose said U-shaped handrail in a position no higher than the lower position.

20. The apparatus according to claim 19 in which:

said first cooperating means includes chain means connected to said drive means and to at least each of said sides of said U-shaped handrail for transmitting drive to said U-shaped handrail to enable said drive means to raise and lower said U-shaped handrail;

and said second cooperating means includes means supported by said U-shaped handrail for cooperation with said movable frame.

21. A vertical transport apparatus for transporting a person between lower and upper vertically spaced positions including:

a movable frame having a platform adjacent its top;

said platform having a support surface at the lower position when said movable frame is in its lowermost position;

a fixed frame hidden from view and disposed lower than the lower position;

said movable frame being supported by said fixed frame for substantially vertical movement relative thereto;

a U-shaped handrail supported by said movable frame for substantially vertical movement relative thereto;

said U-shaped handrail including:

a base;

and a pair of substantially parallel legs extending substantially perpendicular to said base, said base and said legs being in the same horizontal plane;

said U-shaped handrail having no portion disposed higher than said support surface of said platform when each of said U-shaped handrail and said movable frame is in its lowermost position;

said legs of said U-shaped handrail being disposed adjacent opposite sides of said support surface of said platform;

said base of said U-shaped handrail being disposed adjacent an end of said support surface of said platform;

drive means for raising and lowering said U-shaped handrail a first predetermined distance relative to said movable frame, said U-shaped handrail being disposed in a raised position relative to said platform after said U-shaped handrail is raised the first predetermined distance from its lowermost position;

said legs and said base surrounding a person on said support surface of said platform on three sides when said U-shaped handrail is in its raised position relative to said platform;

said drive means including first cooperating means for cooperating with said U-shaped handrail to raise and lower said U-shaped handrail relative to said movable frame;

said first cooperating means including second cooperating means for cooperating with said movable frame after said U-shaped handrail has been raised the first predetermined distance to cause movement of said movable frame with said U-shaped handrail by said drive means for a second predetermined distance to dispose said movable frame in its maximum raised position in which said support surface of said platform is at the upper position at which said support surface of said platform is substantially level with a surface of a structure to which a person on said support surface of said platform is to transfer;

said drive means lowering said U-shaped handrail and said movable frame the second predetermined distance after said U-shaped handrail and said movable frame have been raised the second predetermined distance;

and said fixed frame having stopping means for stopping downward movement of only said movable frame after said U-shaped handrail and said movable frame have been lowered the second predetermined distance from their uppermost positions while allowing said drive means to lower said U-shaped handrail the first predetermined distance to its lowermost position to dispose said U-shaped handrail lower than said support surface of said platform.

22. The apparatus according to claim 21 including:

said legs of said U-shaped handrail having posts extending downwardly therefrom;

said first cooperating means including separate receiving means for receiving each of said posts;

and said movable frame having guide means for guiding each of said separate receiving means of said first cooperating means to maintain substantially vertical movement of said first cooperating means and said U-shaped handrail.

23. The apparatus according to claim 22 in which:

said first cooperating means includes chain means connected to said drive means and to each of said separate receiving means to enable said drive means to raise and lower said U-shaped handrail;

and said second cooperating means includes means connected to at least one of said separate receiving means for engaging said movable frame.

* * * * *

UNITED STATES PATENT AND TRADEMARK OFFICE
CERTIFICATE OF CORRECTION

PATENT NO. : 5,186,282
DATED : Februaruy 16, 1993
INVENTOR(S) : Paul R. Everhard et al It is certified that error appears in the above-indentified patent and that said Letters Patent is hereby corrected as shown below:

Column 3, line 52, "tube" should read --tubes--.
Column 4, line 4, "pair" should read --pairs--.
Column 4, line 25, after "19" insert a --,--.
Column 4, line 54, "tubers" should read --tubes--.
Column 4, line 55, after "58" insert a --,--.
Column 6, line 9, "block" should read --blocks--.
Column 7, line 27, "support" should read --supported--.
Column 7, line 39, after "Electric" insert --,--.
Column 8, line 53, "engages" should read --engage--.
Column 9, line 13, "of" (first occurrence) should read --or--.
Column 9, line 68, after "wall" insert --142.--.
Column 17, line 16, "U shaped" should read --U-shaped--.
Column 19, line 17, cancel "sec-".
Column 19, line 18, cancel "ond".
Column 21, line 34, should read as follows:
--said transmitting means of said driving means including:
    a first drive transmitting chain connected to one
      of the opposite sides of said retaining means;
    a second drive transmitting chain connected to the other
      of the opposite sides of said retaining means;
    drive supply means for supplying drive from said motive
      means to each of said first and second drive transmitting
      chains;
    and a pair of chain sporckets mounted on each of the opposite
      sides of said movable support means and having one of said
      first and second drive transmitting chains pass therearound
      prior to connecting said drive transmitting chain to one of
      the opposite sides of said retaining means whereby said first
      and second drive transmitting chains lift said movable support
      means and said retaining means the second predetermined
      distance

UNITED STATES PATENT AND TRADEMARK OFFICE
CERTIFICATE OF CORRECTION

PATENT NO. : 5,186,282
DATED : February 16, 1993
INVENTOR(S) : Paul R. Everhard et al It is certified that error appears in the above-indentified patent and that said Letters Patent is hereby corrected as shown below:

together when said retaining means engages said movable support means after said retaining means has been moved the first predetermined distance by said motive means.--

Signed and Sealed this

Twelfth Day of July, 1994

Attest:

BRUCE LEHMAN

Attesting Officer        Commissioner of Patents and Trademarks